US012547017B2

(12) United States Patent
Wang

(10) Patent No.: US 12,547,017 B2
(45) Date of Patent: Feb. 10, 2026

(54) CONNECTING ASSEMBLY FOR WEARABLE DEVICE, WEARABLE DEVICE, AND WEARABLE APPARATUS

(71) Applicant: GUANGDONG OPPO MOBILE TELECOMMUNICATIONS CORP., LTD., Guangdong (CN)

(72) Inventor: Jiangxin Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 18/302,059

(22) Filed: Apr. 18, 2023

(65) Prior Publication Data
US 2023/0258956 A1 Aug. 17, 2023

Related U.S. Application Data

(63) Continuation of application No. PCT/CN2021/117743, filed on Sep. 10, 2021.

(30) Foreign Application Priority Data

Nov. 13, 2020 (CN) .......................... 202011269011.1

(51) Int. Cl.
*G02C 5/22* (2006.01)
*G02C 11/00* (2006.01)

(52) U.S. Cl.
CPC ................ *G02C 5/22* (2013.01); *G02C 11/10* (2013.01)

(58) Field of Classification Search
CPC . G02C 5/22; G02C 5/008; G02C 5/14; G02C 5/2227; G02C 11/10; G02C 11/00; G02C 2200/08; G02C 3/02
(Continued)

(56) References Cited

U.S. PATENT DOCUMENTS 10,488,668 B2 11/2019 Cazalet
10,761,346 B1 * 9/2020 Yang .................. G02B 27/0176
(Continued)

FOREIGN PATENT DOCUMENTS

CN 108427211 8/2018
CN 208459687 2/2019
(Continued)

OTHER PUBLICATIONS

WIPO, International Search Report and Written Opinion for International Application No. PCT/CN2021/117743, Dec. 3, 2021.
(Continued)

*Primary Examiner* — William R Alexander
(74) *Attorney, Agent, or Firm* — Hodgson Russ LLP

(57) ABSTRACT

A connecting assembly for a wearable device, a wearable device, and a wearable apparatus are provided. The connecting assembly includes a first connector, a second connector, and a rotating mechanism. The first connector is configured to connect a housing assembly of the wearable device. The second connector is configured to connect a wearable assembly of the wearable device. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

17 Claims, 21 Drawing Sheets

(58) Field of Classification Search
USPC .......................................................... 351/153
See application file for complete search history.

(56) References Cited

U.S. PATENT DOCUMENTS

| | | | |
|---|---|---|---|
| 2016/0033789 A1 | 2/2016 | Klant | |
| 2017/0299863 A1 | 10/2017 | Luo | |
| 2019/0041666 A1* | 2/2019 | Abele | .................... G02B 27/00 |
| 2019/0229395 A1* | 7/2019 | Hintermann | ........... H01Q 21/28 |
| 2020/0174281 A1 | 6/2020 | Gui et al. | |

FOREIGN PATENT DOCUMENTS

| | | |
|---|---|---|
| CN | 109782447 | 5/2019 |
| CN | 210666201 | 6/2020 |
| CN | 111665635 | 9/2020 |
| KR | 200469057 | 9/2013 |

OTHER PUBLICATIONS

CNIPA, First Office Action for CN Application No. 202011269011. 1, Dec. 16, 2021.
EPO, Extended European Search Report for EP Application No. 21890787.1, Apr. 25, 2024.
EPO, Communication for EP Application No. 21890787.1, Oct. 15, 2025.

* cited by examiner

CONNECTING ASSEMBLY FOR WEARABLE DEVICE, WEARABLE DEVICE, AND WEARABLE APPARATUS

CROSS-REFERENCE TO RELATED APPLICATIONS

This application is a continuation of International Application No. PCT/CN2021/117743, filed Sep. 10, 2021, which claims priority to Chinese Patent Application No. 202011269011.1, filed Nov. 13, 2020, the entire disclosures of which are incorporated herein by reference.

TECHNICAL FIELD

This disclosure relates to the field of smart wearable device technology, and specifically relates to a connecting assembly for a wearable device, a wearable device, and a wearable apparatus.

BACKGROUND

Mainstream product forms of wearable devices include a wrist-supported watch type (including products such as a watch and a watch band), a foot-supported shoes type (including products such as shoes, socks, and other wearable products worn on legs in the future), a head-supported glass type (including glasses, a helmet, a worn piece, and the like), and various non-mainstream product forms such as an intelligent clothing, a bag, a walking stick, and an accessory.

A head-mounted device is a wearable device worn on the head of a user, and displays corresponding contents in a region corresponding to the left eye of the user and corresponding contents in a region corresponding to the right eye of the user in a display screen of the head-mounted device, so that the user can experience a display effect of virtual reality (VR) and augmented reality (AR). Wearing stability and comfort of wearable devices has received more and more attention due to the variety of head shapes, face shapes, and weights of wearers.

SUMMARY

In one aspect of implementations of the present disclosure, a connecting assembly for a wearable device is provided. The connecting assembly includes a first connector, a second connector, and a rotating mechanism. The first connector is configured to connect a housing assembly of the wearable device. The second connector is configured to connect a wearable assembly of the wearable device. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

In another aspect of implementations of the present disclosure, a wearable device is provided. The wearable device includes a wearable assembly, a housing assembly, an optical-mechanical assembly, a camera assembly, and a connecting assembly. The optical-mechanical assembly is accommodated in the housing assembly. The camera assembly is accommodated in the housing module. The connecting assembly includes a first connector, a second connector, and a rotating mechanism. The first connector is configured to connect the housing assembly. The second connector is configured to connect the wearable assembly. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

In yet another aspect of implementations of the present disclosure, a wearable apparatus is provided. The wearable apparatus includes a housing assembly, an optical-mechanical assembly, a camera assembly, a wearable assembly, and a connecting assembly. The optical-mechanical assembly is accommodated in the housing assembly. The camera assembly is accommodated in the housing module. The wearable assembly includes a first wearable member and a second wearable member. The first wearable member and the second wearable member are respectively connected with the housing assembly, and the first wearable member and the second wearable member are each in an arc-strip-shape and extending in a direction of approaching to each other, to make the wearable device clamp when being worn. The connecting assembly includes a first connector, a second connector, and a rotating mechanism. The first connector is configured to connect the housing assembly. The second connector is configured to connect the wearable assembly. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

BRIEF DESCRIPTION OF THE DRAWINGS

In order to describe technical solutions of implementations of the present disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Figure 1:
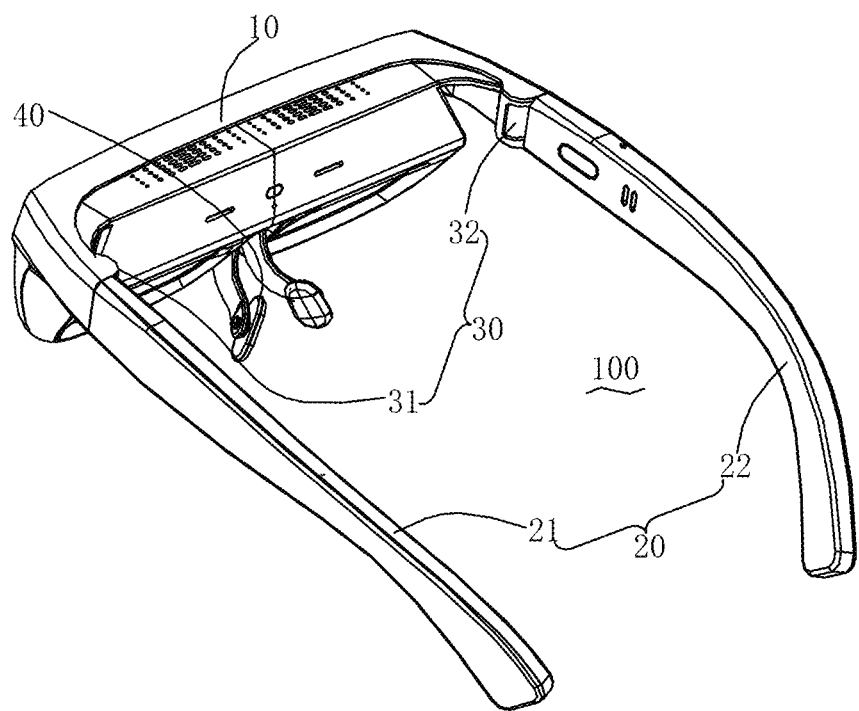
FIG. 1 is a schematic structural view of a wearable device in some implementations of the present disclosure.

Technical solutions of the present disclosure will be further described below through implementations with reference to the accompanying drawings. It will be appreciated that implementations are described herein for the purpose of explaining the disclosure rather than limiting the disclosure. Likewise, the following implementations are merely a part rather than all of implementations of the present disclosure, and all other implementations obtained by those of ordinary skill in the art without creative effort shall fall within the scope of protection of the present disclosure.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those of ordinary skill in the art that an implementation described herein may be combined with other implementations.

In one aspect of implementations of the present disclosure, a connecting assembly for a wearable device is provided. The connecting assembly for a wearable device includes a first connector, a second connector, and a rotating mechanism. The first connector is configured to connect a housing assembly of the wearable device. The second connector is configured to connect a wearable assembly of the wearable device. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

In an implementation, the first connector includes a first connecting portion and a first fixing portion, the first connecting portion is connected with the rotating mechanism, and the first fixing portion is configured to connect the housing assembly; and an end of the first fixing portion away from the first connecting portion is bent and extends to form the limiting portion.

In an implementation, an extending direction of the limiting portion is perpendicular to a plane where the first fixing portion is located.

In an implementation, the second connector includes a second connecting portion and a second fixing portion, the second connecting portion is connected with the rotating mechanism, and the second fixing portion is configured to connect the wearable assembly; and the first connecting portion includes a first connecting sub-portion and a second connecting sub-portion spaced apart from the first connecting sub-portion, and the second connecting portion is disposed between the first connecting sub-portion and the second connecting sub-portion.

In an implementation, the first connecting sub-portion defines a first through-hole, the second connecting sub-portion defines a second through-hole, and the second connecting sub-portion defines a third through-hole. The first through-hole, the second through-hole, and the third through-hole are coaxial.

In an implementation, the rotating mechanism includes a first rotating member, a second rotating member, and a rotating shaft. The first rotating member is connected with the first connector. The second rotating member is connected with the second connector. The rotating shaft penetrates through the first rotating member and the second rotating member. The first rotating member and the second rotating member can rotate relative to each other around the rotating shaft to make the first connector and the second connector rotate around the rotating shaft.

In an implementation, the first through-hole defines at least one first recess at an inner sidewall of the first through-hole, the first rotating member is provided with at least one first projection at an outer sidewall of the first rotating member, and the first recess and the first projection are fitted to connect the first rotating member with the first connector; and the third through-hole defines at least one second recess at an inner sidewall of the third through-hole, the second rotating member is provided with at least one second projection at an outer sidewall of the second rotating member, and the second recess and the second projection are fitted to connect the second rotating member with the second connector.

In an implementation, the first rotating member is provided with at least one sliding block on one side of the first rotating member close to the second rotating member; the second rotating member defines at least one sliding groove on one side of the second rotating member close to the first rotating member; and the first rotating member is connected with the second rotating member through the at least one sliding block and at least one the sliding recess.

In an implementation, the rotating mechanism further includes an elastic piece and a fastener, the elastic piece is disposed between the second rotating member and the second connecting sub-portion, and the fastener is disposed on one side of the second connecting sub-portion away from the elastic piece; and the rotating shaft further penetrates through the elastic piece and the second connecting sub-portion, and the fastener is configured to fix the rotating shaft.

In an implementation, the connecting assembly further includes a first metal piece, the first metal piece is connected with the first connector and disposed in the housing assembly of the wearable device, and the first metal piece is of a nut structure.

In an implementation, the connecting assembly further includes a second metal piece, the second metal piece is connected with the second connector and is disposed in the wearable assembly of the wearable device.

In an implementation, the second metal piece includes a substrate and a first stud disposed on the substrate, the second connector is provided with a second stud, and the second stud is sleeved on the first stud.

In another aspect of the present disclosure, a wearable device is provided. The wearable device includes a wearable assembly, a housing assembly, an optical-mechanical assembly, a camera assembly, a connecting assembly. The optical-mechanical assembly is accommodated in the housing assembly. The camera assembly is accommodated in the housing module. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

In an implementation, the housing assembly defines an accommodating groove at an end of the housing assembly close to the connecting assembly, and the connecting assembly is partially disposed in the accommodating groove; and the wearable assembly defines an accommodating cavity at an end of the wearable assembly close to the connecting assembly, and the connecting assembly is partially disposed in the accommodating cavity.

In an implementation, the wearable assembly is provided with a first shield and a second shield at an end of the wearable assembly close to the housing assembly, the first shield is covered on one side of the connecting assembly, and the second shield is covered on another side of the connecting assembly opposite to said one side; and the first shield and the second shield each extends from the end of the wearable assembly into the accommodating cavity.

In an implementation, the first connector defines at least one first fixing hole, the second connector defines at least one second fixing hole, the housing assembly defines at least one third fixing hole fitted with the at least one first fixing hole, and the wearable assembly defines at least one fourth fixing hole fitted with the at least one second fixing hole. An axis of each of the at least one first fixing hole is perpendicular to a rotation axis of the rotating mechanism, and an axis of each of the at least one second fixing hole is perpendicular to the rotation axis of the rotating mechanism.

In an implementation, the accommodating groove defines a fifth fixing hole at a sidewall of the accommodating groove, a rotating shaft of the rotating mechanism defines a rotating-shaft fixing hole, and the rotating-shaft fixing hole and the fifth fixing hole corporate to fix the rotating shaft; an axis of the fifth fixing hole and an axis of the rotating-shaft fixing hole each is parallel to an axis of the rotating shaft.

In an implementation, the connecting assembly includes at least one first metal piece, and the first metal piece is connected with the first connector and is disposed in the housing assembly; and the at least one first metal piece is disposed in the at least one third fixing hole by hot melting in one-to-one correspondence.

In an implementation, the connecting assembly further includes a second metal piece, and the second metal piece is connected with the second connector and is disposed in the wearable assembly; and the second metal piece and a first housing of the wearable assembly are integrally formed by an injection molding process.

In another aspect of the present disclosure, a wearable apparatus is provided. The wearable apparatus includes a housing assembly, an optical-mechanical assembly, a camera assembly, a wearable assembly, and a connecting assembly. The optical-mechanical assembly is accommodated in the housing assembly. The camera assembly is accommodated in the housing module. The wearable assembly includes a first wearable member and a second wearable member. The first wearable member and the second wearable member are respectively connected with the housing assembly, and the first wearable member and the second wearable member are each in an arc-strip-shape and extending in a direction of approaching to each other, to make the wearable device clamp when being worn. The connecting assembly includes a first connector, a second connector, a rotating mechanism. The first connector is configured to connect the housing assembly. The second connector is configured to connect the wearable assembly. The rotating mechanism is connected with the first connector and the second connector respectively. The first connector and the second connector are configured to rotate relative to each other through the rotating mechanism. The first connector is provided with a limiting portion at an end of the first connector away from the rotating mechanism, and the limiting portion is configured to cooperate with the housing assembly to limit movement of the first connector.

A connecting assembly for a wearable device, a wearable device, and a wearable apparatus are provided in implementations of the present disclosure. The first connector is configured to connect the housing assembly and the second connector is configured to connect the wearable assembly, the first connector and the second connector are configured to rotate relative to each other via the rotating mechanism, such that relative rotation of the housing assembly and the wearable assembly is realized. In addition, the limiting portion is disposed on the first connector and cooperates with the housing assembly to limit the movement of the first connector, so as to prevent the connecting assembly from loosening due to a rotational tension, thereby improving the stability of the wearable assembly when being unfolded or folded.

The electronic device may include various handheld devices, in-vehicle devices, wearable devices or wearable apparatuses, computing devices that have wireless communication functions or other processing devices connected with the wireless modem, as well as various forms of user equipment (UE), mobile stations (MS), terminal devices, and the like. For the convenience of description, the above-mentioned devices are collectively referred to as an electronic device.

The wearable device or the wearable apparatus may be, for example, a smart bracelet, a smart watch, VR glasses, AR glasses, a smart anklet, and a smart belt, which is not limited herein, and as long as a wearable device or the wearable apparatus can be worn on a body, said wearable device or said wearable apparatus can be understood as the wearable device or the wearable apparatus of the present disclosure. For ease of description, the wearable device or the wearable apparatus in implementations of the present disclosure is described by using a head-mounted device as an example.

Figure 2:
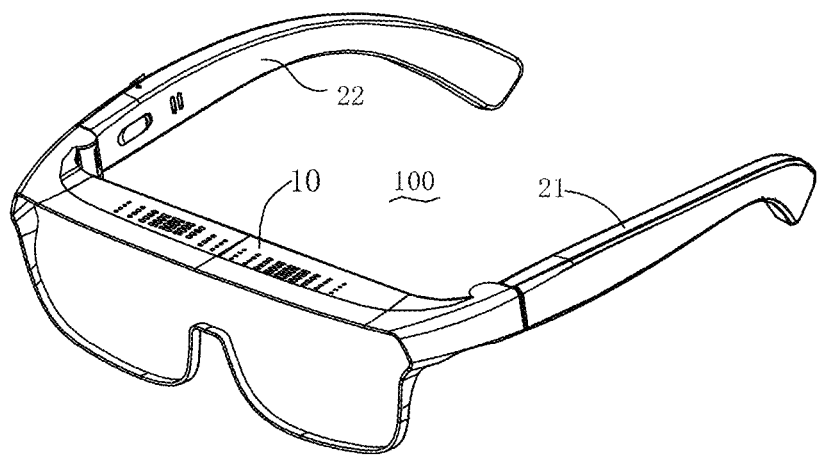
FIG. 2 is a schematic structural view of the wearable device in an implementation of FIG. 1 from another perspective.
Figure 3:
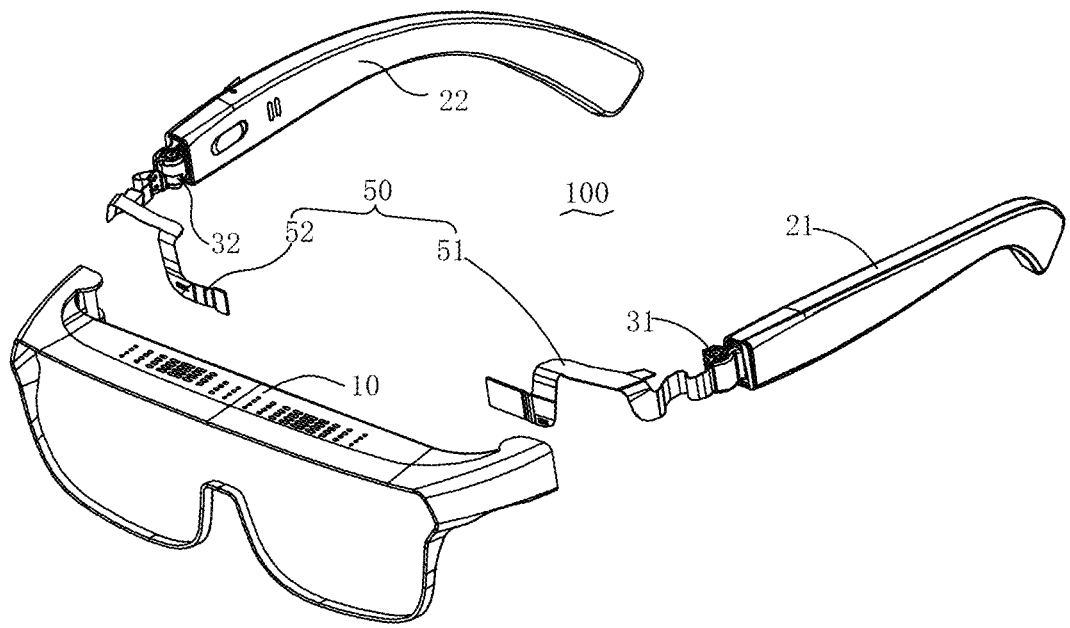
FIG. 3 is an exploded schematic structural view of the wearable device in the implementation of FIG. 2.

Reference is made to FIGS. 1 to 3 together, where FIG. 1 is a schematic structural view of a wearable device 100 in some implementations of the present disclosure, FIG. 2 is a schematic structural view of the wearable device 100 in an implementation of FIG. 1 from another perspective, and FIG. 3 is an exploded schematic structural view of the wearable device 100 in an implementation of FIG. 2. The wearable device 100 can generally include a housing assembly 10, a wearable assembly 20 connected with both ends of the housing assembly 10, a connecting assembly 30 for connecting the housing assembly 10 with the wearable assembly 20, and a support assembly 40 disposed on the housing assembly 10. The housing assembly 10, the wearable assembly 20, and the connecting assembly 30 may constitute a foldable frame, so as to facilitate wearing of the wearable device 100. The support assembly 40 is disposed on a lower side of the frame and is configured to share a weight of the wearable device 100 borne by the head of the user. Preferably, the wearable device 100 may be VR glasses, AR glasses, or the like. In implementations of the present disclosure, the AR glasses are taken as an example for description.

It should be understood that, in implementations of the present disclosure, the wearable device is taken as an example for exemplary description, and for relevant features of the wearable apparatus, reference can be made to specific descriptions of the wearable device, which will not be described in detail herein again.

Specifically, the wearable assembly 20 may include two wearable members, which are a first wearable member 21 and a second wearable member 22, respectively. The first wearable member 21 and the second wearable member 22 cooperate with each other so that the wearable device 100 clamp when being worn on the body. One end of the first wearable member 21 is connected with a corresponding end of the housing assembly 10, and the other end of the first wearable member 21 extends in a direction away from the housing assembly 10 to form a free end. The second wearable member 22 may be mounted in a mounting manner similar to that of the first wearable member 21. That is, the first wearable member 21 and the second wearable member 22 are connected with corresponding ends of the housing assembly 10 of the wearable device 100 respectively. The first wearable member 21 and the second wearable member 22 are each in an arc-strip-shape and extend in a direction of approaching to each other on the same side of the housing assembly 10, so as to make the wearable device 100 clamp when being worn.

There may be two connecting assemblies 30, which are a first connecting assembly 31 and a second connecting assembly 32, respectively. The first wearable member 21 is movably connected with one end of the housing assembly 10 via the first connecting assembly 31, and the second wearable member 22 is movably connected with the other end of the housing assembly 10 via the second connecting assembly 32. In other words, the wearable assembly 20 is movably connected with the housing assembly 10 via the connecting assemblies 30. The first wearable member 21 and the second wearable member 22 are each in an arc-strip-shape, for example, the first wearable member 21 and the second wearable member 22 may be each in a rectangular-bar-shape, a cylindrical-bar-shape, a prismatic-bar-shape, or the like.

When the user wears AR glasses, the first wearable member 21 and the second wearable member 22 can be stretched and deformed, and the wearable device 100 can clamp when being worn on the body under the action of deformation tension. The first wearable member 21 and the second wearable member 22 may be two temples of the AR glasses, respectively. The support assembly 40 is configured to support the housing assembly 10 to share a weight of the wearable device 100. The support assembly 40 may be a nose pad of the AR glasses. When the AR glasses is taken off, the wearable assembly 20 can be folded and unfolded through the connecting assemblies 30, which facilitate placement of the AR glasses.

For example, the wearable device 100 is AR glasses, and the wearable device 100 can be configured to transmit signals to an external processing device and receive data from the external processing device through signal connection. The signal connection may be a wired connection, a wireless connection, or a combination thereof. However, in other cases, the wearable device 100 can serve as a stand-alone device, and data processing is performed on the wearable device 100 itself. The signal connection may be configured to carry any kind of data, such as image data (e.g., still images including 2D and 3D images and/or complete motion video), audio, multimedia, voice, and/or any other types of data. The external processing device may be, for example, a game console, a personal computer, a tablet computer, a smart phone, or other types of processing devices. The signal connection may be, for example, a universal serial bus (USB) connection, a Wi-Fi connection, a Bluetooth or Bluetooth low energy (BLE) connection, an Ethernet connection, a cable connection, a digital subscriber line (DSL) connection, a cellular connection (e.g., 3G, LTE/4G, or 5G), and so on, or any combination thereof. Additionally, the external processing device can communicate with one or more other external processing devices via a network, and the internet may be or include, for example, a local region network (LAN), a wide region network (WAN), an intranet, a metropolitan region network (MAN), a global internet, or any combination thereof.

The wearable device 100 can further include a host accommodated in the housing assembly 10, and the host may include an optical-mechanical assembly, a camera assembly, a mainboard, a loudspeaker assembly, a microphone assembly, and the like. Since the housing assembly 10 is configured to accommodate and protect the host, the housing assembly 10 may also be referred to as a host housing or a protective housing. The housing assembly 10 and a host which is accommodated in the housing assembly 10 may form a host assembly. A display assembly, an optical device, a sensor, a processor, and the like may be mounted in the housing assembly 10 of the wearable device 100. In AR glasses, the display assembly is designed, for example, to overlay an image on a view of user's real-world environment by projecting light into the user's eyes. The wearable device 100 can also include an ambient-light sensor, and an electronic circuitry to control at least some of the above components and perform associated data processing functions. The electronic circuitry may include, for example, one or more processors and one or more memories.

In some implementations, the wearable device 100 further includes a circuit board 50, and the circuit board 50 is accommodated in the housing assembly 10 and the wearable assembly 20, so as to implement signal transmission. Some components of the host may be accommodated in the wearable assembly 20, for example, components such as the loudspeaker assembly and the microphone assembly may be accommodated in the wearable assembly 20. The circuit board 50 may generally include a first circuit board 51 and a second circuit board 52. The first circuit board 51 is accommodated in the first wearable member 21 and the housing assembly 10, and the second circuit board 52 is accommodated in the second wearable member 22 and the housing assembly 10.

It should be noted that, unless specified or limited otherwise, the terms "mounted", "installed", "connected", and the like should be understood broadly, and may be, for example, a fixed connection, a detachable connection, or an integral connection; may also be a mechanical or electric connection, a direct connection or an indirect connection via intervening structures, or an inner communication of two elements. Specific meanings of the above terms herein may be understood as per specific conditions by those of ordinary skill in the art.

First Wearable Member 21 of the Wearable Assembly 20

Figure 4:
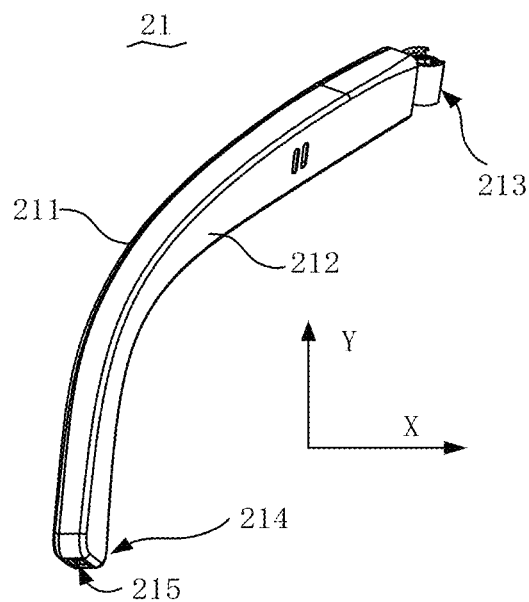
FIG. 4 is a schematic structural view of a first wearable member in a first implementation of the present disclosure.

Reference is made to FIG. 4, which is a schematic structural view of a first wearable member 21 in a first implementation of the present disclosure. The first wearable member 21 may include a wearable body 211 and a wearable cover 212. When the wearable device 100 is worn by the user, the wearable cover 212 contacts the body, and the wearable body 211 is disposed on one side of the wearable cover 212 away from the body, that is, the wearable cover 212 is disposed on one side of the wearable body 211 close to the body. The first wearable member 21 is substantially in an arc-strip-shape, so as to generate a certain deformation when the first wearable member 21 is worn and provide a clamping force through a deformation tension. The shape of the second wearable member 22 matches the shape of the first wearable member 21, and the first wearable member 21 and the second wearable member 22 are each in an arc-strip-shape and extending in a direction of approaching to each other, so that the first wearable member 21 and the second wearable member 22 can cooperate with each other and provide clamping forces through respective deformation tensions.

The wearable body 211 and the wearable cover 212 are each made of plastic, and each have certain bending stiffness. In implementations of the present disclosure, the wearable body 211 is generally made of a hard plastic material with relatively high hardness, that is, a hard rubber. When the wearable device 100 is worn, the hard rubber may provide a certain deformation tension to make the wearable device 100 clamp and be fixed. Meanwhile, the hard rubber has good toughness and generally will not break or crack during repeated deformation. The wearable cover 212 is generally made of a soft plastic material with relatively low hardness, that is, a soft rubber. When the wearable device 100 is worn, the soft rubber can improve fit and comfort of a surface of the wearable cover 212 which is in contact with the body. It can be understood that, in the general plastic industry, the soft rubber and the hard rubber are relative, and polyethylene (PE) and polypropylene (PP) mentioned in the general plastic industry belong to the soft rubber. However, PE and PP are considered as hard materials with respect to flexible plastics such as soft polyvinyl chloride (PVC), silica gel, and ethylene vinyl acetate copolymer (EVA). Therefore, in implementations of the present disclosure, the hardness of the material of the wearable cover 212 is less than the hardness of the material of the wearable body 211, and the elastic modulus of the material of the wearable cover 212 is extremely small relative to the elastic modulus of the material of the wearable body 211.

The wearable body 211 is fixedly connected with the wearable cover 212, so that the first wearable member 21 has good stability. For example, the wearable body 211 and the wearable cover 212 may be connected via an adhesive connection, a snap connection, a screw-and-nut connection, etc. In some other implementations, the wearable body 211 and the wearable cover 212 may be integrally formed, for example, the wearable body 211 and the wearable cover 212 may be integrally formed through an injection molding process.

Figure 5:
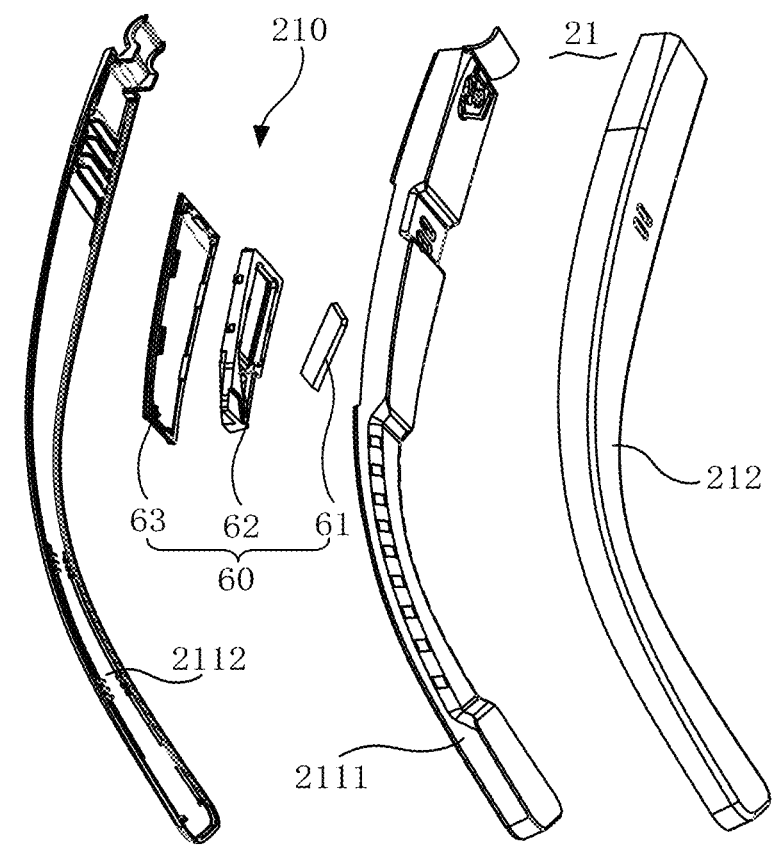
FIG. 5 is an exploded schematic structural view of a first wearable member in an implementation of FIG. 4.

Reference is made to FIG. 5 in combination, where FIG. 5 is an exploded schematic structural view of the first wearable member 21 in the implementation of FIG. 4. The wearable body 211 may include a first housing 2111 and a second housing 2112. The first housing 2111 is disposed between the second housing 2112 and the wearable cover 212. That is, in an X direction illustrated in FIG. 4, the second housing 2112, the first housing 2111, and the wearable cover 212 are disposed in sequence. The first housing 2111 and the second housing 2112 cooperatively define an accommodating cavity 210, and a loudspeaker assembly 60 is received in the accommodating cavity 210. The loudspeaker assembly 60 generally includes a loudspeaker 61, a loudspeaker support 62, and a sound-chamber cover-plate 63. The loudspeaker support 62, the sound-chamber cover-plate 63, and the first housing 2111 cooperatively define a sound chamber of the loudspeaker 61. In addition, structural components such as a circuit board and lines may further be accommodated in the accommodating cavity 210, so as to cooperate to implement corresponding functions of the wearable device 100.

Figure 6:
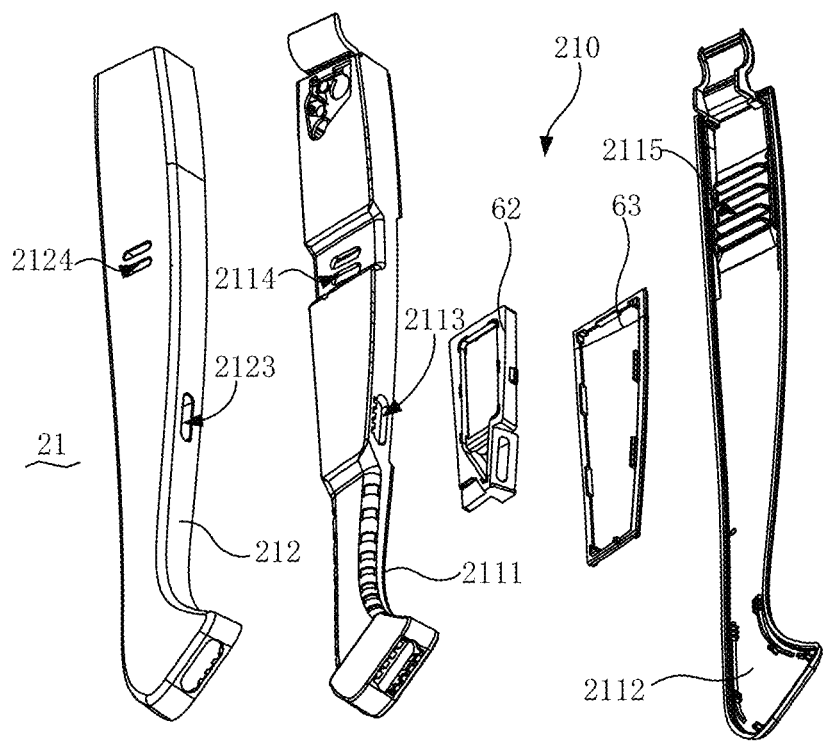
FIG. 6 is a schematic structural view of the first wearable member in the implementation of FIG. 4 from another perspective.

Reference is further made to FIG. 6, which is a schematic structural view of the first wearable member 21 in the implementation of FIG. 4 from another perspective. The first housing 2111 defines a first sound-outlet hole 2113 and a first sound-relief hole 2114. The wearable cover 212 defines a second sound-outlet hole 2123 communicating with the first sound-outlet hole 2113 and a second sound-relief hole 2124 communicating with the first sound-relief hole 2114. The first sound-outlet hole 2113 communicates with a sound-outlet channel of the loudspeaker assembly 60 to implement a loudspeaker function. Due to a change of an ambient temperature, air in the sound chamber of the loudspeaker expands when heated and contracts when cooled, which leads to a change of an air pressure. If the sound chamber is completely sealed with no sound-relief hole being designed, the air in the sound chamber is unable to be effectively relieved after expanding, or no air enters from outside after the air in the sound chamber contracts. A diaphragm of the loudspeaker will be affected, causing the diaphragm to deform and affecting sound production of the loudspeaker.

The first sound-outlet hole 2113 and the first sound-relief hole 2114 are respectively disposed on different sidewalls of the first housing 2111. For example, the wearable device 100 is AR glasses, the first sound-outlet hole 2113 is disposed on a sidewall of the first housing 2111 close to the ear of the user, and the first sound-relief hole 2114 is disposed on a sidewall of the first housing 2111 close to a contact surface between the AR glasses and the body, that is, the first sound-relief hole 2114 is disposed on the sidewall of the first housing 2111 close to the wearable cover 212.

Further, the first sound-outlet hole 2113 and the first sound-relief hole 2114 are spaced apart from each other, and an orthographic projection of the first sound-outlet hole 2113 on the sidewall where the first sound-outlet hole 2113 is disposed and an orthographic projection of the loudspeaker support 62 on the sidewall where the first sound-outlet hole 2113 is disposed at least partially overlap, so that the first sound-outlet hole 2113 communicates with a sound-outlet channel on the loudspeaker support 62. An orthographic projection of the first sound-relief hole 2114 on the sidewall where the first sound-outlet hole 2113 is disposed is in connection with an outer edge of the orthographic projection of the loudspeaker support 62 on the sidewall where the first sound-outlet hole 2113 is disposed. A gap between the loudspeaker support 62 and the first housing 2111 communicates with the first sound-relief hole 2114, so as to avoid an influence of the change of the air pressure on the sound production of the loudspeaker. Alternatively, an orthographic projection of the first sound-relief hole 2114 on the second housing 2112 is in connection with an outer edge of an orthographic projection of the loudspeaker support 62 on the second housing 2112, and the gap between the loudspeaker support 62 and the first housing 2111 communicates with the first sound-relief hole 2114. The second housing 2112 defines a sound-relief groove 2115 corresponding to the first sound-relief hole 2114, and the orthographic projection of the first sound-relief hole 2114 on the second housing 2112 falls in the sound-relief groove 2115, so as to stabilize the air pressure in the sound chamber of the loudspeaker and avoid affecting the sound production of the loudspeaker due to the change of the air pressure.

The first housing 2111 is fixedly connected with the second housing 2112 and the wearable cover 212 respectively, for example, by means of an adhesive connection, a snap connection, a screw-and-nut connection, etc. In some other implementations, the first housing 2111 and the wearable cover 212 may be integrally formed, for example, the first housing 2111 and the wearable cover 212 may be integrally formed through an injection molding process. Preferably, the first housing 2111 and the second housing 2112 are bonded through an adhesive, and the first housing 2111 and the wearable cover 212 are integrally formed through a double-shot injection molding process.

In implementations of the present disclosure, the loudspeaker 61 is fixedly disposed on the loudspeaker support 62, the loudspeaker support 62 is fixedly connected with the first housing 2111, and the loudspeaker support 62 and the first housing 2111 cooperatively define a front sound-chamber of the loudspeaker 61. The sound-chamber cover-plate 63 is fixedly connected with the first housing 2111, and is configured to seal the sound chamber of the loudspeaker 61, that is, an orthographic projection of the sound-chamber cover-plate 63 on the first housing 2111 covers an orthographic projection of the loudspeaker support 62 on the first housing 2111. The sound-chamber cover-plate 63 and the loudspeaker support 62 cooperatively define a rear sound-chamber of the loudspeaker 61.

Further, the wearable cover 212 is substantially in an arc-strip-shape, so that the wearable cover 212 can generate a certain deformation when being worn, and then a clamping force of the wearable cover 212 can be provided. The wearable cover 212 may include a connecting end 213 and a free end 214. The connecting end 213 is configured to connect the housing assembly 10 of the wearable device, and the free end 214 is away from the connecting end 213 in an arc-shaped extending direction (Y direction illustrated in FIG. 4) of the wearable cover 212. Preferably, the wearable body 211 and the wearable cover 212 are each in the arc-strip-shape and arranged side by side in the arc-shaped extending direction of the first wearable member 21. The first housing 2111 and the second housing 2112 are each arc-shaped and are arranged side by side in the arc-shaped extending direction of the first wearable member 21.

The free end 214 may be provided with a signal interface 215. The signal interface 215 may be a Type-C interface, a B-5Pin interface, a B-4Pin interface, a B-8Pin interface, a B-8Pin-2×4 interface, a micro USB interface, or the like. The signal interface 215 may be connected, through a line, with functional devices such as an internal circuit and a host of the wearable device 100, and is configured to implement a corresponding function of the wearable device 100.

Figure 7:
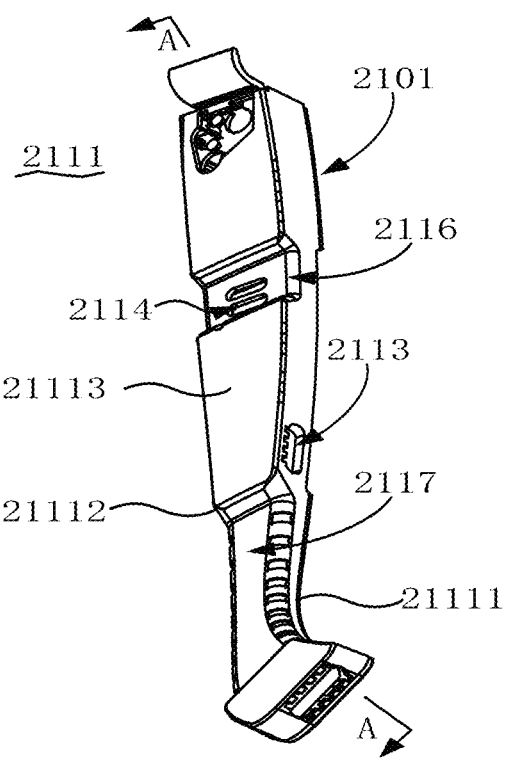
FIG. 7 is a schematic structural view of a first housing in the implementation of FIG. 4.

Reference is made to FIG. 7, which is a schematic structural view of the first housing 2111 in the implementation of FIG. 4. The first housing 2111 may include a first sidewall 21111, a second sidewall 21112 disposed opposite to the first sidewall 21111, and a bottom wall 21113 that connects the first sidewall 21111 with the second sidewall 21112. The first sidewall 21111, the second sidewall 21112, and the bottom wall 21113 cooperatively define an accommodating groove 2101, and the second housing 2112 covers an opening of the accommodating groove 2101 to define an accommodating cavity 210. The first sound-outlet hole 2113 is defined on the first sidewall 21111 or the second sidewall 21112, and the first sound-relief hole 2114 is defined on the bottom wall 21113. It can be understood that, the first sidewall 21111, the second sidewall 21112, and the bottom wall 21113 are sidewalls of the first housing 2111 which is in an arc shape.

During research, the applicant found that the wearable body 211, which is made of a hard material having certain bending stiffness, is generally small in deformation and poor in fitting to the head of the body. Therefore, in implementations of the present disclosure, the fit of the wearable body 211 is improved by reducing the bending stiffness of the wearable body 211, and a stacking space inside the wearable body 211 and structural reliability can be ensured.

Figure 8:
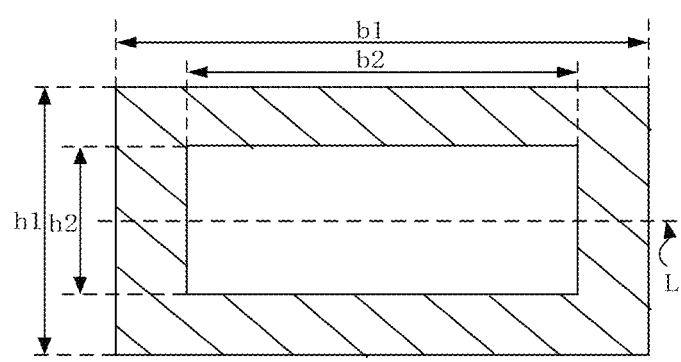
FIG. 8 is a schematic principle diagram of reducing bending stiffness of the wearable body in the implementation of FIG. 4.

It can be understood that, a cross section of the wearable body 211 is roughly a rectangular frame with an outer rectangle and an inner rectangle. Reference is made to FIG. 8, which is a schematic principle diagram of reducing bending stiffness of the wearable body 211 in the implementation shown in FIG. 4. Specifically, the bending stiffness of the wearable body 211 is substantially EI, where E represents an elastic modulus of a material, and I represents an inertia moment of the cross section of the wearable body 211 about a bending neutral axis L. The bending neutral axis L is a central line of the cross section of the wearable body 211, and the central line is perpendicular to a plane where the first sidewall 21111 or the second sidewall 21112 is located. In general, when the elastic modulus E of the material is fixed, the bending stiffness mainly depends on the inertia moment I, that is, the bending stiffness of the wearable body 211 is reduced by reducing the inertia moment I. The inertia moment I can be calculated according to the following formula:

$$I = \frac{1}{12}b_1 h_1^3 - \frac{1}{12}b_2 h_2^3. \quad (1)$$

In formula (1), $b_1$ and $h_1$ represent side lengths of the outer rectangle of the cross section of the rectangular frame, and $b_2$ and $h_2$ represent side lengths of the inner rectangle of the cross section of the rectangular frame. It can be seen from formula (1) that reducing the side lengths $b_1$ and $h_1$ of the cross section of the rectangular frame, i.e. the thickness of the wearable body 211 can effectively reduce the bending stiffness of the cross section of the rectangular frame. In addition, if the overall thickness of the wearable body 211 is reduced, an internal stacking space of the wearable body 211 is inevitably reduced, which does not facilitate an internal structural layout of the wearable body 211.

Based on this, the applicant further makes studies to find that when the wearable device 100 is worn for use, a main deformation region of the first wearable member 21 is concentrated on a partial region. Therefore, the bending stiffness of the wearable body 211 can be effectively reduced by performing thickness reduction on the main deformation area. In addition, an acting force that clamps the head caused by overall deformation of the first wearable member 21 is adjusted, so that wearing comfort and wearing stability of the wearable device 100 can be optimized. In implementations of the present disclosure, the wearable body 211 has at least one recess disposed between two ends of the wearable body 211, so as to reduce the bending stiffness of the wearable body 211 when the wearable device clamps and is worn on a body.

Figure 9:
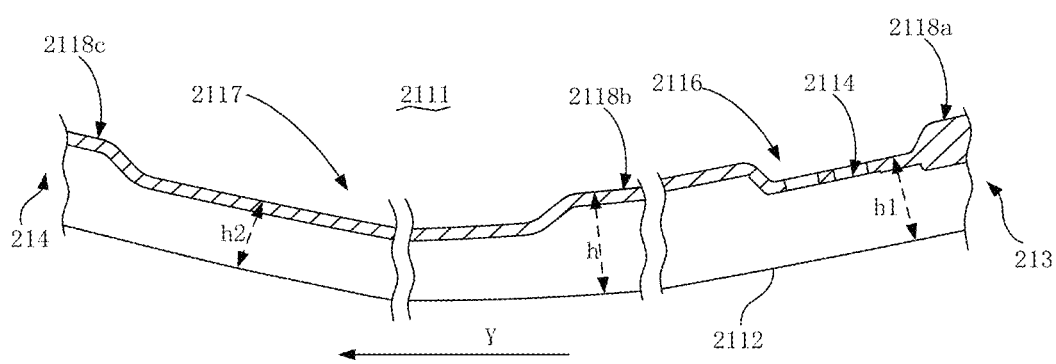
FIG. 9 is a schematic partial cross-sectional structural view of FIG. 7 taken along line A-A.

Reference is made to FIG. 9, which is a schematic partial cross-sectional structural view of FIG. 7 taken along A-A. The wearable body 211 has multiple recesses, such as a first recess 2116, a second recess 2117, and the like. The multiple recesses are spaced apart in an arc-shaped extending direction of the wearable body 211, and the multiple recesses are spaced apart between the connecting end 213 and the free end 214.

In implementations of the present disclosure, a part of the bottom wall 21113 of the first housing 2111 is recessed towards the second housing 2112 to define the multiple recesses. In a direction perpendicular to the arc-shaped extending direction of the wearable body 211, that is, in a direction perpendicular to the second housing 2112, the wearable body 211 has a thickness h, the first recess 2116 has a first thickness h1, and the second recess 2117 has a second thickness h2. h1<h, h2<h, and the first thickness h1 and the second thickness h2 may be the same or different. The first recess 2116 is close to the connecting end 213, the second recess 2117 is close to the free end 214, and the first recess 2116 and the second recess 2117 are spaced apart in the arc-shaped extending direction (Y direction illustrated in FIG. 9) of the first wearable member 21 away from the housing assembly 10.

It can be understood that the terms "first", "second", and "third" in implementations of the present disclosure are only used for description, and cannot be understood as indicating or implying relative importance or implicitly indicating the number of indicated technical features. Thus, a feature defined by "first", "second", and "third" may explicitly or implicitly include at least one said feature.

The wearable body 211 further includes multiple projections 2118, and the projections 2118 each have a thickness h in the direction perpendicular to the arc-shaped extending direction of the wearable body, i.e., perpendicular to the second housing 2112. The thickness of the projections 2118 can be seen as the thickness of the wearable body 211. In other words, in the direction perpendicular to the arc-shaped direction of the wearable body 211, the thicknesses of the recesses are smaller than the thickness of the projections. In other implementations, the thickness of the projections 2118 may be slightly greater than the thickness of the wearable body 211. By arranging the multiple projections 2118 for installing corresponding structural components (such as the loudspeaker assembly, the circuit board, and the line), a layout space of an internal structure of the wearable body 211 is improved. Further, a part of the multiple projections is disposed between a recess and the connecting end; and/or, a part of the multiple projections is disposed between a recess and the free end; and/or a part of the multiple projections is disposed between two adjacent recesses.

For example, the projections 2118 may include a first projection 2118a, a second projection 2118b, and a third projection 2118c, the first recess 2116 is disposed between the first projection 2118a and the second projection 2118b, and the second recess 2117 is disposed between the second projection 2118b and the third projection 2118c. In other implementations, the projections and the recesses may be arranged in other combination manners, which will not be described in implementations of the present disclosure. The loudspeaker assembly 60 may be disposed inside one of the first projection 2118a, the second projection 2118b, and the third projection 2118c. Preferably, the circuit board that connects the first wearable member 21 with the housing assembly 10 may be disposed inside the first projection 2118a, the loudspeaker assembly 60 may be disposed inside the second projection 2118b, the line may be disposed inside the third projection 2118c to be connected with an interface inside the free end 214, and the first sound-relief hole 2114 may be disposed at an inner sidewall of the first recess 2116 or an inner sidewall of the second recess 2117.

Specifically, parts of the bottom wall of the first housing 2111 are recessed to define the first recess 2116 and the second recess 2117, non-recessed parts of the bottom wall forms the projections 2118, and an opening direction of a recess of the bottom wall is away from the second housing 2112. The thicknesses of the bottom wall and the sidewalls of the first housing 2111 are substantially uniform, so as to ensure overall structural strength of the first housing 2111. In other words, wall-thicknesses of the first recess 2116, the second recess 2117, and the projection 2118 are substantially the same.

Corresponding structural components need to be installed inside the projection 2118, causing that an inertia moment of a cross section of the projection 2118 is relatively great and a deformation amount of the projection 2118 is relatively small. Based on this, in implementations of the present disclosure, by reducing an inertial moment of the cross section of the first recess 2116 and an inertial moment of the second recess 2117, the bending stiffness of the cross section of the first recess 2116 and the bending stiffness of the cross section of the second recess 2117 are reduced, such that an acting force of clamping the head caused by overall deformation of the wearable body 211 is adjusted, so that the wearing comfort and wearing stability of the wearable device 100 can be optimized.

Figure 10:
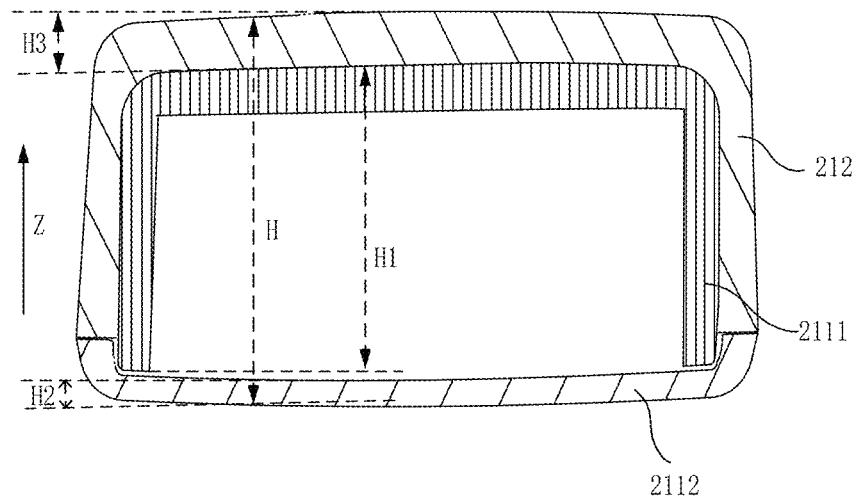
FIG. 10 is a schematic cross-sectional structural view of a first wearable member in an implementation of FIG. 9.
Figure 11:
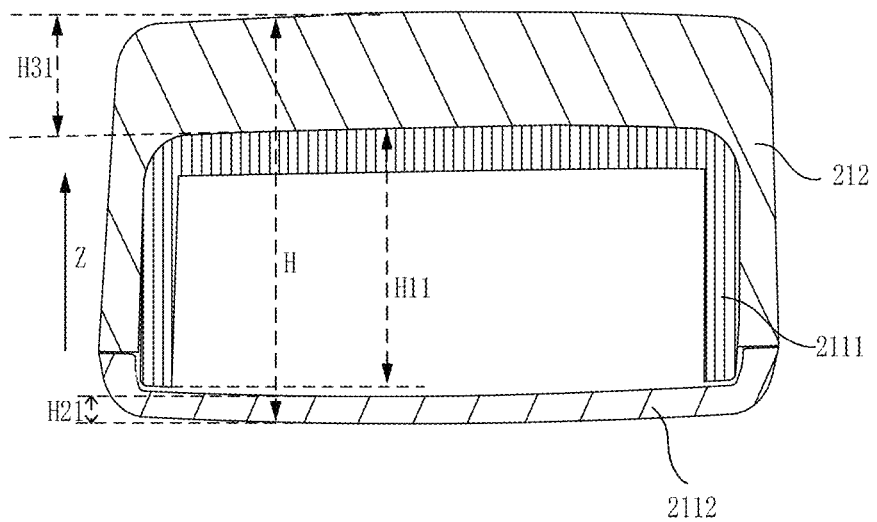
FIG. 11 is another schematic cross-sectional structural view of the first wearable member in the implementation of FIG. 9.

Reference is made to FIGS. 10 and 11 in combination, where FIG. 10 is a schematic cross-sectional structural view of the first wearable member 21 in an implementation of FIG. 9, and FIG. 11 is a schematic cross-sectional view of the first wearable member 21 in the implementation of FIG. 9. FIG. 10 is a schematic cross-sectional view mainly for illustrating the first wearable member 21 corresponding to a projected region, and FIG. 11 is a schematic cross-sectional view mainly for illustrating the first wearable member 21 corresponding to a recessed region. The wearable cover 212 at least wraps on one side of the wearable body 211 facing the first wearable member 21 or at least wraps on one side of the wearable body 211 facing the second wearable member 22, that is, the wearable cover 212 wraps on the first sidewall 21111, the second sidewall 21112, and the bottom wall 21113 of the first housing 2111, so as to improve comfort and stability when the wearable device 100 is worn.

The first wearable member 21 has a thickness H in the Z direction as illustrated in FIGS. 10 and 11. In a region where the projection is located, a thickness H1 of the first housing 2111, a thickness H2 of the second housing 2112, and a thickness H3 of the wearable cover 212 together define the thickness H of the first wearable member 21, that is, H=H1+H2+H3. In a region where the recess is located, a thickness H11 of the first housing 2111, a thickness H21 of the second housing 2112, and a thickness H31 of the wearable cover 212 together define the thickness H of the first wearable member 21, that is, H=H11+H21+H31. In implementations of the present disclosure, the thickness of the second housing 2112 corresponding to the region where the projection of the wearable body 211 is located and the thickness of the second housing 2112 corresponding to the region where the recess is located are substantially the same, that is, H2=H21.

The wearable cover 212 is made of soft rubber, the wearable body 211 is made of hard rubber, and the elastic modulus of the wearable cover 212 is much less than that of the wearable body 211. Therefore, the bending stiffness of the wearable cover 212 has a small influence on the overall bending stiffness of the first wearable member 21, and the bending stiffness of the wearable body 211 has a large influence on the overall bending stiffness of the first wearable member 21. Based on this, the overall bending stiffness of the first wearable member 21 is reduced by reducing the bending stiffness of the wearable body 211.

As described above, a main factor affecting the bending stiffness of the wearable body 211 is the inertia moment of the cross section of the wearable body 211. At the same time, under the premise that structural bodies such as the loudspeaker assembly are stacked in a region where the projection of the wearable body 211 is located, and a main deformation region of the wearable body 211 is concentrated in a region where the recess of the wearable body 211 is defined. Therefore, in implementations of the present disclosure, by adjusting an inertial moment of a cross section of the region where the recess of the wearable body 211 is defined, local bending stiffness of the wearable body 211 is adjusted, and then a clamping force generated by deformation of the first wearable member 21 is adjusted, so that wearing comfort and wearing stability of the wearable device 100 can be optimized.

Specifically, when the thickness H of the first wearable member 21 and the thicknesses H2 and H21 of the second housing 2112 are constant, the thickness H11 of the first housing 2111 corresponding to the region of the recess is reduced, and the thickness H31 of the wearable cover 212 corresponding to the region of the recess is increased, so as to reduce the bending stiffness of the first wearable member 21 corresponding to the recessed region. Additionally, the appearance of the first wearable member 21 can be kept consistent. On the basis of this, in implementations of the present disclosure, H11<H1, H31>H3, and H11+H31=H1+H3.

Further, the wearable cover 212 and the first housing 2111 are integrally formed. For example, a combination of the wearable cover 212 and the first housing 2111 may be integrally formed through an injection molding process, and then the second housing 2112 is connected with the combination through a fixed connection manner such as bonding, to form the first wearable member 21. Preferably, the wearable cover 212 and the first housing 2111 are integrally formed through a double-shot injection molding process, so that the recess is filled with one side of the wearable cover 212 close to the wearable body 211, and thus a surface of the wearable cover 212 which is in contact with the body is smooth, thereby improving the consistency of the appearance of the first wearable member 21 and improving the wearing comfort of the wearable device 100.

Figure 12:
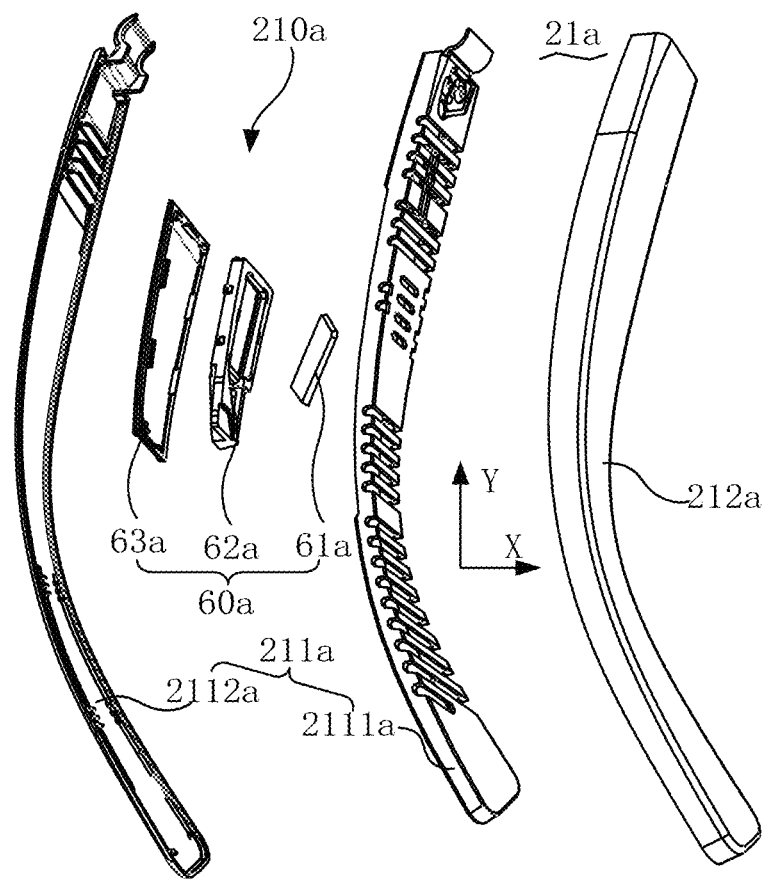
FIG. 12 is an exploded schematic structural view of a first wearable member in a second implementation of the present disclosure.
Figure 13:
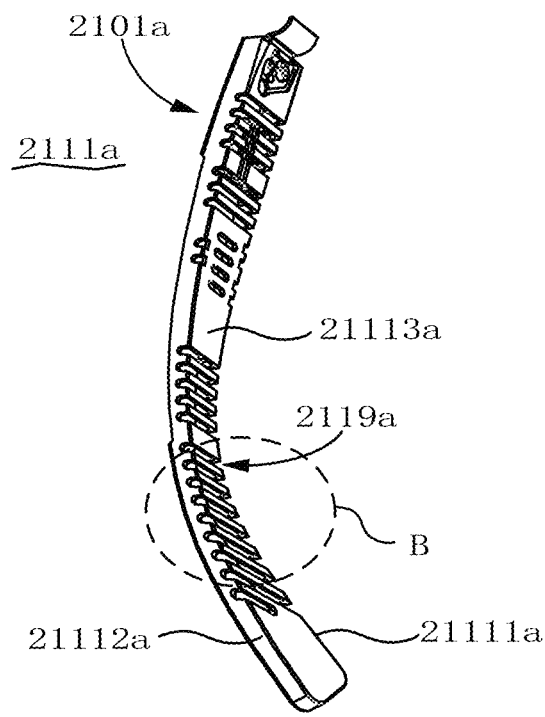
FIG. 13 is a schematic structural view of a first housing in an implementation in FIG. 12.
Figure 14:
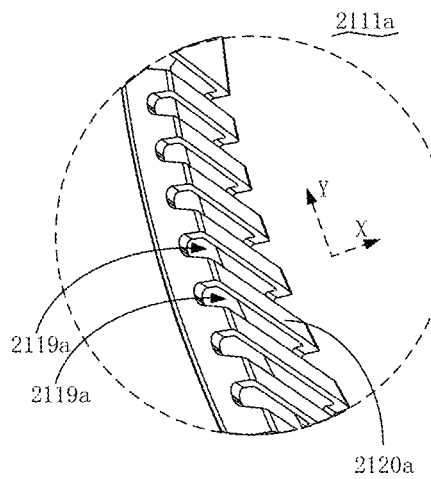
FIG. 14 is a partial enlarged schematic structural view of region B in an implementation of FIG. 13.

In above implementations of the present disclosure, the bending stiffness of the first wearable member 21 is reduced by reducing a local thickness of the wearable body 211. The applicant has proposed in continuing studies whether or not the bending stiffness of the first wearable member 21 can be reduced without reducing a local thickness of the wearable body 211. Based on this idea, in implementations of the present disclosure, another first wearable member is provided. Reference is made to FIGS. 12 to 14, where FIG. 12 is an exploded schematic structural view of a first wearable member 21a in a second implementation of the present disclosure, FIG. 13 is a schematic structural view of a first housing 2111a in an implementation of FIG. 12, and FIG. 14 is a partially enlarged schematic structural diagram of region B in an implementation of FIG. 13. The first wearable member 21a may include a wearable body 211a and a wearable cover 212a, the wearable body 211a may include a first housing 2111a and a second housing 2112a. The implementations of the present disclosure differ from the above implementation in that the bending stiffness of the first housing 2111a and the bending stiffness of the first housing 2111 are reduced in different ways.

The wearable body 211a defines at least one opening 2119a, and the opening 2119a is defined between two ends of the wearable body 211a. When the wearable device 100 is worn on the body, the opening 2119a is defined on one side of the wearable body 211 facing the first wearable member 21a or the second wearable member 22a, so as to reduce the bending stiffness of the wearable body. In implementations of the present disclosure, the wearable body 211a is in an arc-strip-shape, the wearable body 211a defines multiple openings 2119a, and the multiple openings 2119a are arranged at intervals in an arc-shaped extending direction of the wearable body 211a, that is, the multiple openings 2119a are arranged at intervals between two ends of the wearable body 211a.

The first housing 2111a may include a first sidewall 21111a and a second sidewall 21112a disposed opposite to each other, and a bottom wall 21113a connecting the first sidewall 21111a with the second sidewall 21112a. The first sidewall 21111a, the second sidewall 21112a, and the bottom wall 21113a cooperatively define an accommodating groove 2101a, and the second housing 2112a covers an opening of the accommodating groove 2101a to define an accommodating cavity 210a. The accommodating cavity 210a may be configured to accommodate structural components such as a loudspeaker assembly, a circuit board, and a circuit, so as to implement corresponding functions of the wearable device 100. For example, the loudspeaker assembly 60a is disposed in the accommodating cavity 210a. The loudspeaker assembly 60a roughly includes a loudspeaker 61a, a loudspeaker support 62a, and a sound-chamber cover-plate 63a. The loudspeaker support 62a, the sound-chamber cover-plate 63a, and the first housing 2111a cooperatively define a sound chamber of the loudspeaker 61a. For other technical features of the loudspeaker assembly 60a, reference may be made to the loudspeaker assembly 60 in the first implementation, and no further details are provided herein.

Figure 15:
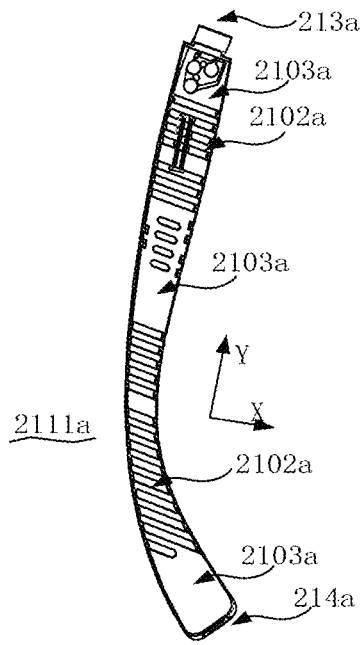
FIG. 15 is a schematic structural view of the first housing in the implementation of FIG. 13 from another perspective.

Reference is made to FIG. 15, which is a schematic structural view of the first housing 2111a in the implementation of FIG. 13 from another perspective. The first housing 2111a roughly includes grooved regions 2102a and non-grooved regions 2103a that are arranged at intervals along an arc-shaped extending direction of the wearable body 211a, that is, the grooved regions 2102a and the non-grooved regions 2103a are sequentially disposed along the arc-shaped extending direction of the wearable body 211a. The grooved regions 2102a are each used for defining an opening 2119a. The wearable body 211a includes a connecting end 213a and a free end 214a. The connecting end 213a is configured to connect the housing assembly of the wearable device, and the free end 214a is away from the connecting end 213a. The grooved regions 2102a and the non-grooved regions 2103a are defined between the connecting end 213a and the free end 214a of the first wearable member 21a, and the grooved regions 2102a are arranged at intervals between the connecting end 213a and the free end 214a.

Further, multiple grooved regions 2102a can be defined and spaced apart from one another, and multiple non-grooved regions 2103a can be defined and spaced apart from one another. Some of non-grooved region 2103a are disposed between a grooved region 2102a and the connecting end 213a; and/or some of non-grooved regions 2103a are disposed between a grooved region 2102a and the free end 214a; and/or, some of the non-grooved regions 2103a are disposed between two adjacent grooved regions 2102a.

The first housing 2111a defines multiple openings 2119a, and the multiple openings 2119a are arranged at intervals in an arc-shaped extending direction (Y direction illustrated in FIG. 12) of the first wearable member 21a away from the housing assembly. According to implementations of the present disclosure, the multiple openings 2119a are defined on the first housing 2111a, so that when the first housing 2111a is deformed, deformation tension can be dispersed into multiple regions, thereby effectively reducing the bending stiffness of the first housing 2111a. In addition, those of ordinary skill in the art can adjust the bending stiffness of the first housing 2111a by adjusting the depth, width, number and layout positions of the openings 2119a according to actual needs, thereby adjusting the bending stiffness of the wearable body 211a. As such, the acting force of clamping the head of the body caused by overall deformation of the wearable body 211a can be adjusted, thereby optimizing the wearing comfort and wearing stability of the wearable device 100. A width-extending direction (Y direction) of the opening 2119a is substantially a length-extending direction or the arc-shaped extending direction of the first wearable member 21a, and a length-extending direction (X direction) of the opening 2119a is substantially a width-extending direction of the first wearable member 21a. The multiple openings 2119a are arranged at intervals in Y direction, and the multiple openings 2119a extend to the first sidewall 21111a and the second sidewall 21112a in X direction, respectively.

Multiple openings 2119a are defined in a grooved region 2102a, the multiple openings 2119a are arranged at intervals in Y direction illustrated in FIG. 12, and the multiple openings 2119a respectively penetrate through the bottom wall 21113a of the first housing 2111a. One end of an opening 2119a extends to the first sidewall 21111a and the other end of the opening 2119a extends to the second sidewall 21112a, such that a U-shaped beam structure can be formed on the first housing 2111a. Specifically, multiple supporting portions 2120a are disposed in the grooved region 2102a, and each of the multiple supporting portions 2120a is disposed between two adjacent openings 2119a, that is, the multiple openings 2119a are defined in the grooved region 2102a to form supporting portions 2120a spaced apart from one another. The supporting portion 2120a is substantially U-shaped, that is, a cross section of the supporting portion 2120a is substantially U-shaped, and the cross section is substantially perpendicular to the first sidewall 21111a, the second sidewall 21112a, and the bottom wall 21113a of the first housing 2111a.

Structural components such as the loudspeaker assembly and the circuit board can be installed in the non-grooved regions 2103a of the first housing 2111a, and therefore the first housing 2111a has a relatively small deformation in the non-grooved regions 2103a, thereby avoiding affecting normal use of the structural components. By defining multiple openings 2119a in the grooved regions 2102a in the present disclosure, the inertia moment of the cross section of the grooved region 2102a can be effectively reduced. Since the bending stiffness of the cross section of the grooved region 2102a is reduced, the acting force of clamping the head of the body caused by overall deformation of the wearable body 211a can be adjusted, so as to optimize the wearing comfort and wearing stability of the wearable device 100.

Figure 16:
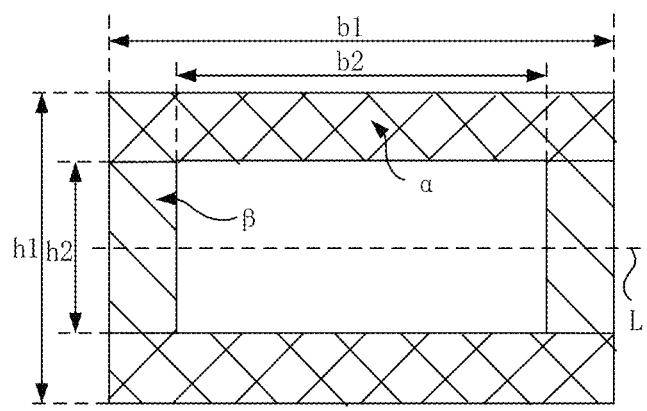
FIG. 16 is a schematic principle diagram of reducing bending stiffness of the wearable body in the second implementation of the present disclosure.

Reference is made to FIG. 16, which is a principal schematic diagram of reducing the bending stiffness of the wearable body 211a in the second implementation of the present disclosure. The cross section of the wearable body 211a is substantially a rectangular frame, and the bending stiffness of the wearable body 211a is substantially EI, where E represents the elastic modulus of the material, I represents the inertia moment of the cross section of the wearable body 211a about the bending neutral axis L. The bending neutral axis L is a central line of the cross section of the wearable body 211a, and the central line is perpendicular to a plane where the first sidewall or the second sidewall of the first housing 2111a is located. In general, when the elastic modulus E of the material is fixed, the bending stiffness mainly depends on the inertia moment I, that is, the bending stiffness of the wearable body 211a is reduced by reducing the inertia moment I. Reference of a formula for calculating the inertia moment I can be made to formula (1).

In implementations of the present disclosure, the cross section of the rectangular frame is divided into an α region and a β region, where a calculation formula of an inertial moment corresponding to the α region and a calculation formula of an inertial moment corresponding to the β region are as follows respectively.

$$I_\alpha = \frac{1}{96}b_1(h_1 - h_2)^3 + \frac{1}{32}b_1(h_1 - h_2)(h_1 + h_2)^2 \quad (2)$$

$$I_\beta = \frac{1}{96}(b_1 - b_2)h_2^3 \quad (3)$$

It can be understood that, for a thin-wall structure similar to the first housing 2111a, a wall thickness of the rectangular frame is obviously less than a side length of the rectangular frame. It can be seen from formula (2) that $$\frac{1}{32}b_1(h_1 - h_2)(h_1 + h_2)^2$$

is much greater than $$\frac{1}{96}b_1(h_1 - h_2)^3,$$

and it can be seen from formula (2) and formula (3) together that $I_\alpha$ is much greater than $I_\beta$. Based on this, the rectangular frame is grooved to form a substantially U-shaped beam structure, and the inertial moment of the cross section of the rectangular frame will be greatly reduced. In addition, in such a structure arrangement, the local thickness of the wearable body 211a does not need to be reduced, and can ensure the stacking space inside the wearable body 211a.

Figure 17:
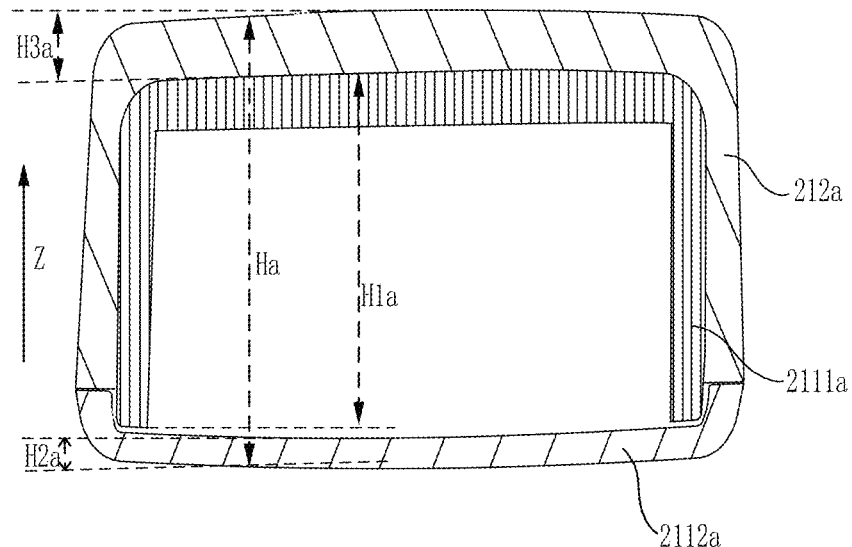
FIG. 17 is a schematic cross-sectional structural view of the first wearable member in the implementation of FIG. 12.
Figure 18:
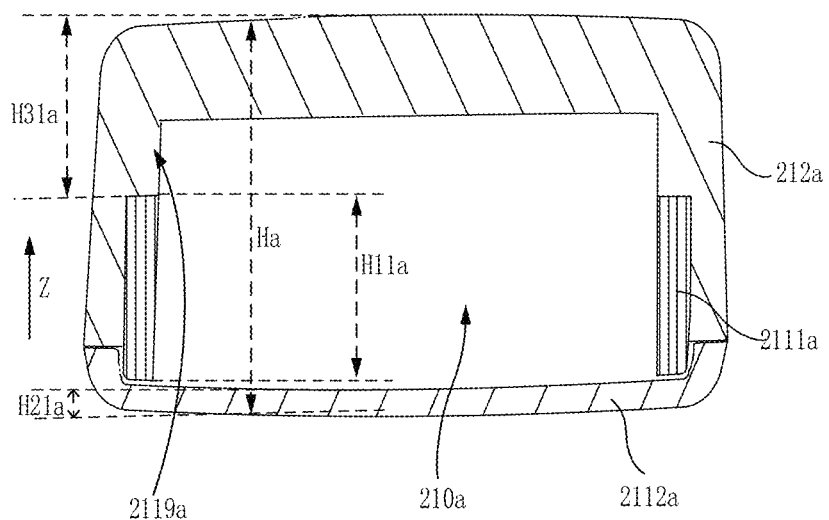
FIG. 18 is another schematic cross-sectional structural view of the first wearable member in the implementation of FIG. 12.

Reference is made to FIGS. 17 and 18, where FIG. 17 is a schematic cross-sectional structural view of the first wearable member 21 in the implementation of FIG. 12, and FIG. 18 is an another schematic cross-sectional structural view of the first wearable member 21 in the implementation of FIG. 12. FIG. 17 is a schematic cross-sectional view mainly for illustrating the first wearable member 21 corresponding to a non-grooved region of the first housing, and FIG. 18 is a schematic cross-sectional view mainly for illustrating the first wearable member 21 corresponding to a grooved region of the first housing. The wearable cover 212a at least covers one side of the wearable body 211a facing the first wearable member 21a or the second wearable member 22a, that is, the wearable cover 212a can cover the first sidewall 21111a, the second sidewall 21112a, and the bottom wall 21113a of the first housing 2111a, so as to improve comfort and stability when the wearable device 100 is worn.

The first wearable member 21a has a thickness Ha in the Z-direction (i.e., perpendicular to an arc-shaped extending direction of the wearable body 211a) as illustrated in FIGS. 17 and 18. In the non-grooved region of the first housing 2111a, a thickness H1a of the first housing 2111a, a thickness H2a of the second housing 2112a, and a thickness H31a of the wearable cover 212a together define a thickness Ha of the first wearable member 21a, that is, Ha=H1a+H2a+H3a. In the grooved region of the first housing 2111a, a thickness H11a of the first housing 2111a, a thickness H21a of the second housing 2112a, and a thickness H31a of the wearable cover 212a together define a thickness Ha of the first wearable member 21a, that is, Ha=H11a+H21a+H31a. In implementations of the present disclosure, the thickness of the second housing 2112a corresponding to the grooved region of the first housing 2111a and the thickness of the second housing 2112a corresponding to the non-grooved region of the first housing 2111a are substantially uniform and the same, that is, H2a=H21a.

Further, the wearable cover 212a and the first housing 2111a are integrally formed. For example, a combination of the wearable cover 212a and the first housing 2111a may be integrally formed through an injection molding process, and then the second housing 2112a is connected with the combination through a fixed connection manner such as bonding, to form the first wearable member 21a. Preferably, the wearable cover 212a and the first housing 2111a are integrally formed through a double-shot injection molding process, so that one side of the wearable cover 212a close to the accommodating cavity 210a and one side of the first housing 2111a close to the accommodating cavity 210a form a seamless smooth surface. The wearable cover 212a partially fills the multiple openings 2119a of the first housing 2111a, so that the inner and outer surfaces of the first wearable member 21a are all smooth surfaces, thereby improving the consistency of the appearance of the first wearable member 21a. In addition, the wearable cover 212a only fills the multiple openings 2119a of the first housing 2111a, and the internal space of the accommodating cavity 210a is not reduced, that is, the wearable body 211a has a substantially constant thickness corresponding to the grooved region and the non-grooved region, so as to facilitate the layout of the internal components of the first wearable member 21.

It can be understood that, the wearable cover 212a is made of soft rubber, the wearable body 211a is made of hard rubber, and the elastic modulus of the wearable cover 212a is much less than that of the wearable body 211a. Therefore, the bending stiffness of the wearable cover 212a has a small influence on the overall bending stiffness of the first wearable member 21a, and the bending stiffness of the wearable body 211a has a large influence on the overall bending stiffness of the first wearable member 21a. Based on this, the bending stiffness of the first wearable member 21a is reduced by reducing the bending stiffness of the wearable body 211a.

As described above, a main factor affecting the bending stiffness of the wearable body 211a is the inertia moment of the cross section of the wearable body 211a. At the same time, under the premise that structural bodies such as the loudspeaker assembly are stacked in a non-grooved region of the wearable body 211a, and a main deformation region of the wearable body 211a is concentrated in the grooved region of the wearable body 211a. Therefore, in implementations of the present disclosure, the bending stiffness of the first housing 2111a is adjusted by adjusting the inertial moment of the cross section of the grooved region of the first housing 2111a, and then the bending stiffness of the wearable body 211a is adjusted, so as to adjust the acting force of clamping the head of the body caused by overall deformation of the wearable body 211a, thereby optimizing wearing comfort and wearing stability of the wearable device 100.

In conjunction with formula (2) and formula (3), it can be seen that the main influence factor of the inertial moment of the cross section of the grooved region is the inertial moment of the cross section of the α region. When the thickness Ha of the first wearable member 21a and the thicknesses H2a and H21 of the second housing 2112a are constant, a part of the first housing 2111a is removed to define an opening 2119a, so as to reduce an inertia moment of the cross section of the grooved region. Meanwhile, the opening 2119a is partially filled with the wearable cover 212a to maintain the conformity of the appearance of the first wearable member 21a. Based on this, in implementations of the present disclosure, H11a<H1a, H31a>H3a, and H11a+H31a=H1a+H3a.

It can be understood that, in implementations of the present disclosure, for technical features not described in detail with respect to the first wearable member 21a, reference can be made to the first wearable member 21 in the foregoing implementations, and details are not described herein again.

Figure 19:
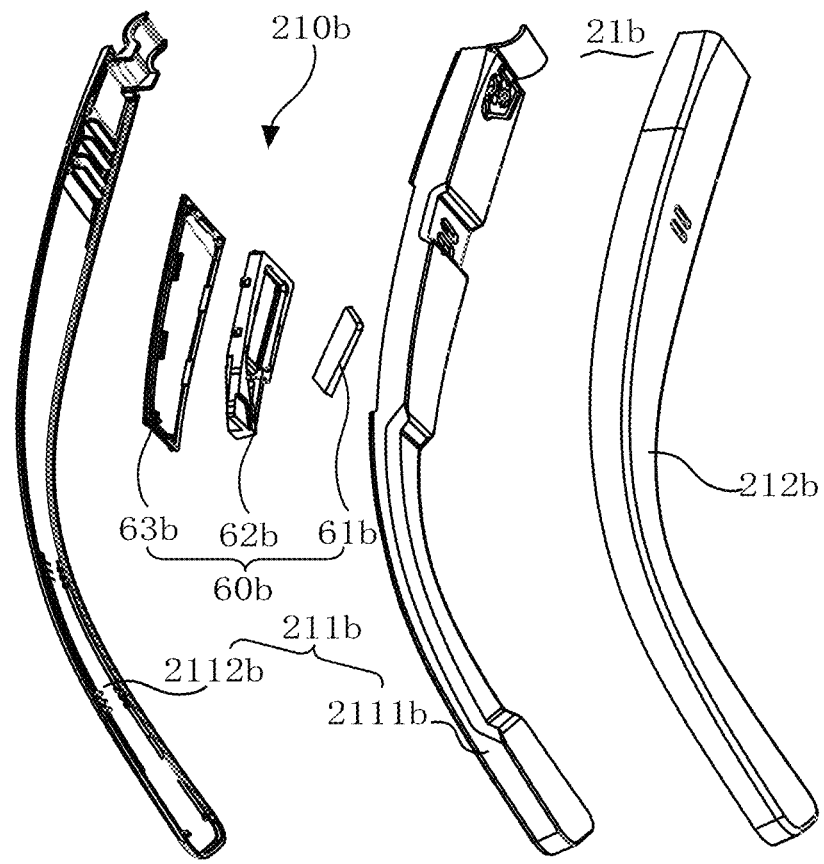
FIG. 19 is an exploded schematic structural view of a first wearable member in a third implementation of the present disclosure.
Figure 20:
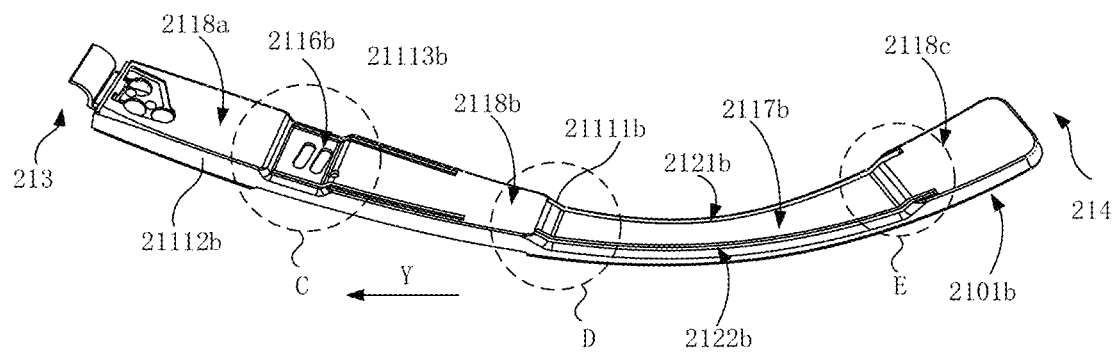
FIG. 20 is a schematic structural view of a first housing in an implementation of FIG. 19.

Reference is made to FIGS. 19 and 20, where FIG. 19 is an exploded schematic structural view of a first wearable member 21b in a third implementation of the present disclosure, and FIG. 20 is schematic structural view of a first housing 2111b in an implementation of FIG. 19. The first wearable member 21b may include a wearable body 211b and a wearable cover 212b. The wearable body 211b may include a first housing 2111b and a second housing 2112b. The difference between the implementation of the present disclosure and the first implementation lies in that the bending stiffness of the first housing 2111b and the bending stiffness of the first housing 2111 are reduced in different ways.

The first housing 2111b may include a first sidewall 21111b and a second sidewall 21112b disposed opposite to each other, and a bottom wall 21113b connecting the first sidewall 21111b with the second sidewall 21112b. The first sidewall 21111b, the second sidewall 21111b, and the bottom wall 21113b cooperatively define an accommodating groove 2101b, and the second housing 2112b covers an opening of the accommodating groove 2101b to define an accommodating cavity 210b. The accommodating cavity 210b may be configured to accommodate structural components such as the loudspeaker assembly, the circuit board, and the line, so as to implement corresponding functions of the wearable device 100. For example, the loudspeaker assembly 60b is disposed in the accommodating cavity 210b. The loudspeaker assembly 60b roughly includes a loudspeaker 61b, a loudspeaker support 62b, and a sound-chamber cover-plate 63b. The loudspeaker support 62b, the sound-chamber cover-plate 63b, and the first housing 2111b cooperatively define a sound chamber of the loudspeaker 61b. For other technical features of the loudspeaker assembly 60b, reference may be made to the loudspeaker assembly 60 in the first implementation, and no further details are provided herein.

The wearable body 211b includes multiple recesses, e.g. a first recess 2116b, a second recess 2117b, etc. The wearable body 211b also includes multiple projections, e.g. a first projection 2118a, a second projection 2118b, and a third projection 2118c, for installing corresponding structural components (e.g. the loudspeaker assembly, the circuit board, the line, etc.). In implementations of the present disclosure, the bending stiffness of the wearable body 211b is reduced by providing multiple recesses, and at the same time, the layout space inside the wearable body 211b can be increased by providing multiple projections. It can be understood that, for specific technical features of the recess and the projection, reference can be made to corresponding descriptions in the first implementation, which will not be repeated herein.

Further, the wearable body 211b further defines at least one opening, and the opening is defined on one side of the wearable body 211b facing the first wearable member 21b or the second wearable member 22b. At least some of the openings are defined on the recesses. In implementations of the present disclosure, the openings may include a first opening 2121b and a second opening 2122b, the first opening 2121b and the second opening 2122b are defined at two opposite sides of the recess, and an extending direction of each of the first opening 2121b and the second opening 2122b is parallel to an arc-shaped extending direction of the wearable body 211b. For example, at least one first opening 2121b is defined between the first sidewall 21111a and the bottom wall 21113b, and the first opening communicates with the accommodating groove 2101b. At least one second opening 2122b is defined between the second sidewall 21112b and the bottom wall 21113b, and the second opening communicates with the accommodating groove 2101b.

Figure 21:
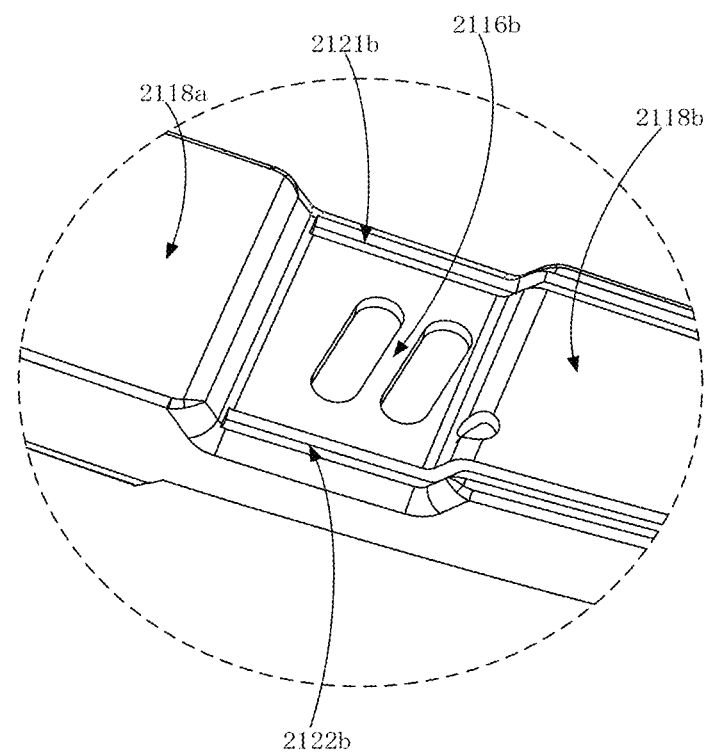
FIG. 21 is a partial enlarged schematic structural view of region C in an implementation of FIG. 20.
Figure 22:
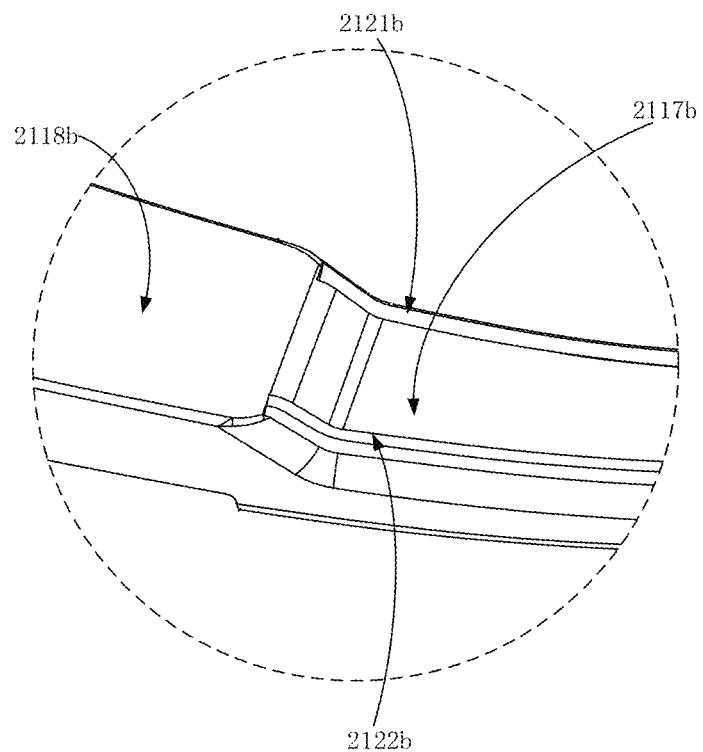
FIG. 22 is a partial enlarged schematic structural view of region D in the implementation of FIG. 20.
Figure 23:
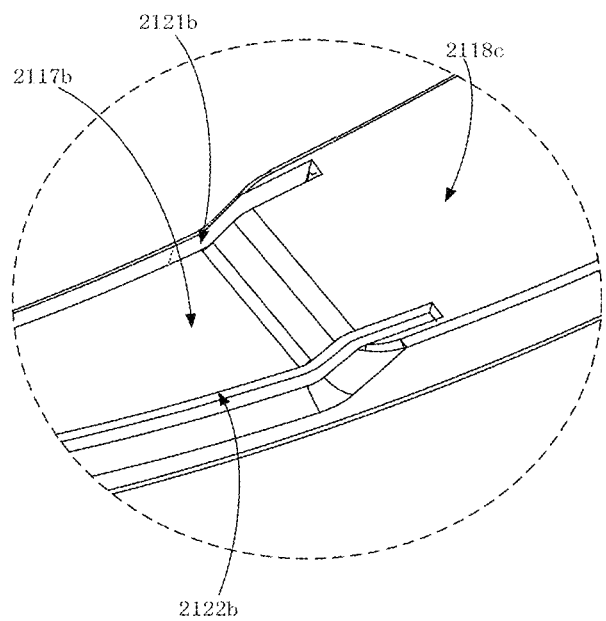
FIG. 23 is a partial enlarged schematic structural view of region E in the implementation of FIG. 20.

Reference is made to FIGS. 21 to 23, where FIG. 21 is a partial enlarged schematic structural view of region C in an implementation of FIG. 20, FIG. 22 is a partial enlarged schematic structural view of region D in the implementation of FIG. 20, and FIG. 23 is a partial enlarged schematic structural view of region E in the implementation of FIG. 20. The first opening 2121b and the second opening 2122b each extend in the length direction (Y direction illustrated in FIG. 20) of the wearable body 211b, and the first opening 2121b and the second opening 2122b are spaced apart from each other.

The first opening 2121b and the second opening 2122b are respectively defined at two opposite sides of the recess, the first opening 2121b can partly extend to the projection, the second opening 2122b can partly extend to the projection, and the first opening 2121b and the second opening 2122b are respectively defined at two opposite sides of the projection.

For example, the first opening 2121b and the second opening 2122b are defined at two opposite sides of the first recess 2116b, respectively. As illustrated in FIG. 21, the first opening 2121b is defined at an edge of the first recess 2116b that is close to the first sidewall 21111b, and the second opening 2122b is defined at an edge of the first recess 2116b that is close to the second sidewall 21112b. Further, the first opening 2121b and the second opening 2122b each may extend in the same direction onto the first projection 2118a or the second projection 2118b that is close to the first recess 2116b. In other implementations, the first opening 2121b and the second opening 2122b can extend in opposite directions, i.e., respectively extend to projections at two ends of the first opening 2121b and the second opening 2122b, that is, one of the first opening 2121b and the second opening 2122b extends to the first projection 2118a, and the other of the first opening 2121b and the second opening 2122b extends to the second projection 2118b.

It can be understood that, the first opening 2121b and the second opening 2122b may be defined at two opposite sides of the first recess 2116b, so that the first recess 2116b has a folded plate-like structure. This structure can bear a relatively low stress when the first housing 2111b is deformed, thereby being beneficial to reducing bending stiffness of the first housing 2111b. In addition, the first opening 2121b may be partially defined on the first projection 2118a and/or the second projection 2118b, so as to prevent the structural strength of the first projection 2118a and/or the second projection 2118b from being greatly reduced, thereby preventing the first projection 2118a and/or the second projection 2118b from deforming greatly and avoiding affecting a working state of internal components in the first projection 2118a and/or the second projection 2118b. The second opening 2122b may be partially defined on the first projection 2118a and/or the second projection 2118b, so as to prevent the structural strength of the first projection 2118a and/or the second projection 2118b from being greatly reduced, thereby preventing the first projection 2118a and/or the second projection 2118b from deforming greatly and avoiding affecting the working state of the internal components in the first projection 2118a and/or the second projection 2118b.

For another example, the first opening 2121b and the second opening 2122b are defined at two opposite sides of the second recess 2117b, respectively. As illustrated in FIG. 22, the first opening 2121b is defined at an edge of the second recess 2117b close to the first sidewall 21111b, and the second opening 2122b is defined at an edge of the second recess 2117b close to the second sidewall 21112b. Based on a structural arrangement as illustrated in FIG. 22, the second recess 2117b has a folded plate-shaped structure. This structure can bear a relatively low stress when the first housing 2111b is deformed, thereby being beneficial to reducing the bending stiffness of the first housing 2111b.

For yet another example, the first opening 2121b and the second opening 2122b are defined at two opposite sides of the second recess 2117b, respectively. As illustrated in FIG. 23, the first opening 2121b and the second opening 2122b may extend in the same direction to the second projection 2118b or the third projection 2118c. In other implementations, the first openings 2121b and second opening 2122b could extend in opposite directions, that is, one of the first openings 2121b and second opening 2122b extends to the second projection 2118b and the other one of the first openings 2121b and second opening 2122b extends to the third projection 2118c.

It can be understood that the first opening 2121b may be partially defined on the second projection 2118b and/or the third projection 2118c, so as to avoid significantly reducing the structural strength of the second projection 2118b and/or the third projection 2118c, and further prevent the second projection 2118b and/or the third projection 2118c from deforming greatly and avoid affecting the working state of the internal components in the second projection 2118b and/or the third projection 2118c. The second opening 2122b can be partially defined on the second projection 2118b and/or the third projection 2118c, so as to avoid significantly reducing the structural strength of the second projection 2118b and/or the third projection 2118c, and further prevent the second projection 2118b and/or the third projection 2118c from deforming greatly and avoid affecting the working state of the internal components in the second projection 2118b and/or the third projection 2118c.

Further, the first opening 2121b is defined at an edge of the bottom wall 2113b close to the first sidewall 21111b, and the first opening 2121b is implemented as multiple first openings 2121b arranged at intervals in Y direction. The second opening 2122b is defined at an edge of the bottom wall 21113b close to the second sidewall 21112b, and the second opening 2122b is implemented as multiple second openings 2122b arranged at intervals in Y direction. In other implementations, the first opening 2121b is defined at an edge of the first sidewall 21111b close to the bottom wall 2113b, and/or the second opening 2122b is defined at an edge of the second sidewall 21112b close to the bottom wall 21113b.

Figure 24:
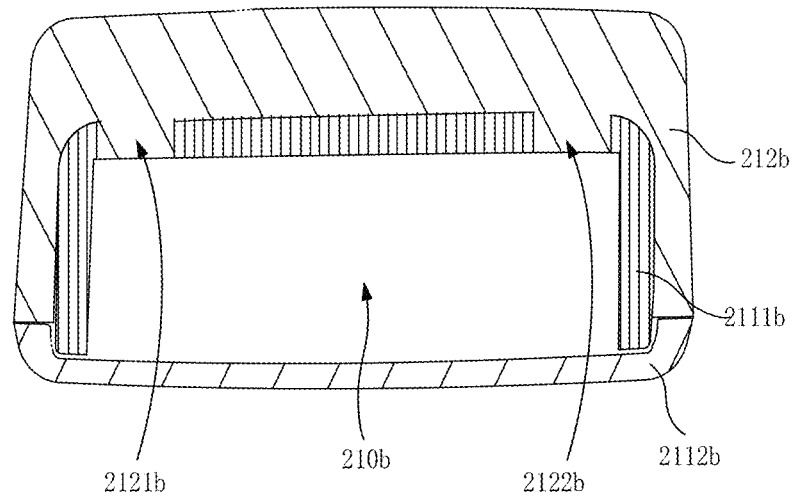
FIG. 24 is a schematic cross-sectional structural view of the first wearable member in the implementation of FIG. 20.

Reference is made to FIG. 24, which is a schematic cross-sectional structural view of the first wearable member 21b in the implementation of FIG. 20. FIG. 24 is a schematic cross-sectional view of the first wearable member 21b corresponding to a recessed region. The wearable cover 212b covers at least one side of the wearable body 211b facing the first wearable member 21b or the second wearable member 22. That is, the wearable cover 212b partially fills the first opening 2121b and the second opening 2122b, so that inner and outer surfaces of the first wearable member 21b are smooth, thereby improving the consistency of the appearance of the first wearable member 21b.

Specifically, the wearable cover 212b and the first housing 2111b are integrally formed. For example, a combination of the wearable cover 212b and the first housing 2111b may be integrally formed through an injection molding process, and then the second housing 2112b is connected with the combination in a fixed connection manner such as bonding to form the first wearable member 21b. Preferably, the wearable cover 212b and the first housing 2111b are integrally formed through a double-shot injection molding process, so that a surface of the wearable cover 212b close to the accommodating cavity 210b and a surface of the first housing 2111b close to the accommodating cavity 210b form a seamless smooth surface.

According to the first wearable member 21b provided in implementations of the present disclosure, the first opening 2121b and the second opening 2122b are defined in the recessed region of the wearable body 211b, so that the wearable body 211b has a folded plate-like structure in the recessed region, and the folded plate-like structure can bear a lower stress when the wearable body 211b deforms, thereby being beneficial to reducing the bending stiffness of the wearable body 211b. With reference to the formulas (1), (2), and (3) in the first implementation and the second implementation, the inertial moment of the cross section of the folded plate-like structure is less than the inertial moment of the cross section of the rectangular frame structure, which helps to adjust the bending stiffness of the first wearable member 21, so as to adjust the acting force of the clamping of the head of the body caused by overall deformation of the wearable assembly, thereby optimizing the wearing comfort and wearing stability of the wearable device 100.

It can be understood that, in implementations of the present disclosure, for technical features not described in detail with respect to the first wearable member 21b, reference may be made to the first wearable members 21 and 21a in the foregoing implementations, which will not be described in detail herein again.

Second Wearable Member 22 of the Wearable Assembly 20

The structure of the second wearable member 22 is substantially the same as that of the first wearable member 21, and specific structural features of the second wearable member 22 will not be described in detail herein. It should be noted that structural components accommodated in the second wearable member 22 may be different from or the same as structural components accommodated in the first wearable member 21. For example, the first wearable member 21 and the second wearable member 22 each accommodate a loudspeaker assembly, a loudspeaker assembly in the first wearable member 21 is connected with the first circuit board 51, and a loudspeaker assembly in the second wearable member 22 is connected with the second circuit board 52. For another example, a signal interface is disposed at the free end of the first wearable member 21, a circuit for connecting the signal interface is disposed in the first wearable member 21, and no signal interface needs to be disposed at the free end of the second wearable member 22.

Housing Assembly 10 and Connecting Assembly 30

Figure 25:
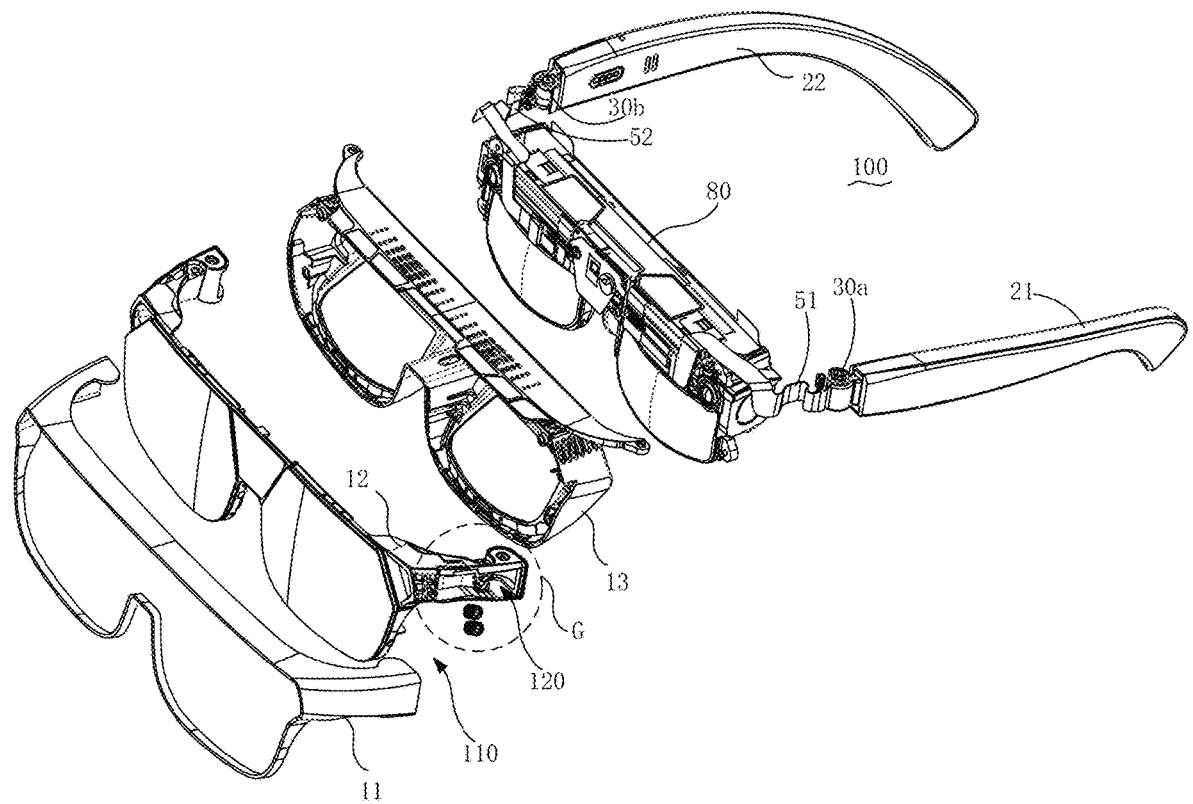
FIG. 25 is an exploded schematic structural view of a wearable device in other implementations of the present disclosure.

Reference is made to FIG. 25, which is an exploded schematic structural view of a wearable device 100 in other implementations of the present disclosure. The housing assembly 10 includes a front housing 11, a middle housing 12, and a rear housing 13. The middle housing 12 and the rear housing 13 cooperate with each other to accommodate the host 80 of the wearable device 100. For example, the middle housing 12 may be buckled with the rear housing 13 to accommodate the host 80.

Further, the front housing 11 covers the top of the middle housing 12, the front housing 11 cooperate with the middle housing 12 at corresponding ends of the middle housing 12 to define an accommodating space 110, and the accommodating space 110 can be used for accommodating a part of the connecting assembly 30 and a part of the circuit board 50. The accommodating space 110 is defined at an end of the front housing 11 close to the wearable assembly 20 and an end of the middle housing 12 close to the wearable assembly 20.

For example, in some implementations, the middle housing 12 defines an accommodating groove 120 at an end corresponding to the wearable assembly 20, and an end of the front housing 11 corresponding to the wearable assembly 20 covers the accommodating groove 120 to define the above accommodating space 110. One end of the connecting assembly 30 is received in the accommodating groove 120, and the other end of the connecting assembly 30 is received in an end of the wearable assembly 20 corresponding to the accommodating groove 120. In other implementations, the front housing 11 defines an accommodating groove at an end corresponding to the wearable assembly 20, and an end of the middle housing 12 corresponding to the wearable assembly 20 covers the accommodating groove to define the above accommodating space 110. Alternatively, the front housing 11 defines a groove structure at an end of the front housing 11 corresponding to the wearable assembly 20, and the middle housing 12 defines a groove structure at an end of the middle housing 12 corresponding to the wearable assembly 20, and when the front housing 11 and the middle housing 12 are fitted with each other, the groove structure of the front housing communicates with the groove structure of the middle housing to define an accommodating groove.

In implementations of the present disclosure, two connecting assemblies 30 may be disposed, which are a connecting assembly 30a and a connecting assembly 30b, respectively. The connecting assembly 30a is configured to connect the first wearable member 21 with the housing assembly 10, and the connecting assembly 30b is configured to connect the second wearable member 22 with the housing assembly 10. It can be understood that the connecting assembly 30a and the connecting assembly 30b are substantially the same in structures, and therefore, a connection relationship between the housing assembly 10 and the wearable assembly 20 is described below only by taking one of the connecting assemblies as an example. It can be understood that the wearable assembly 20 may be the wearable assembly 20 in the foregoing implementations.

Figure 26:
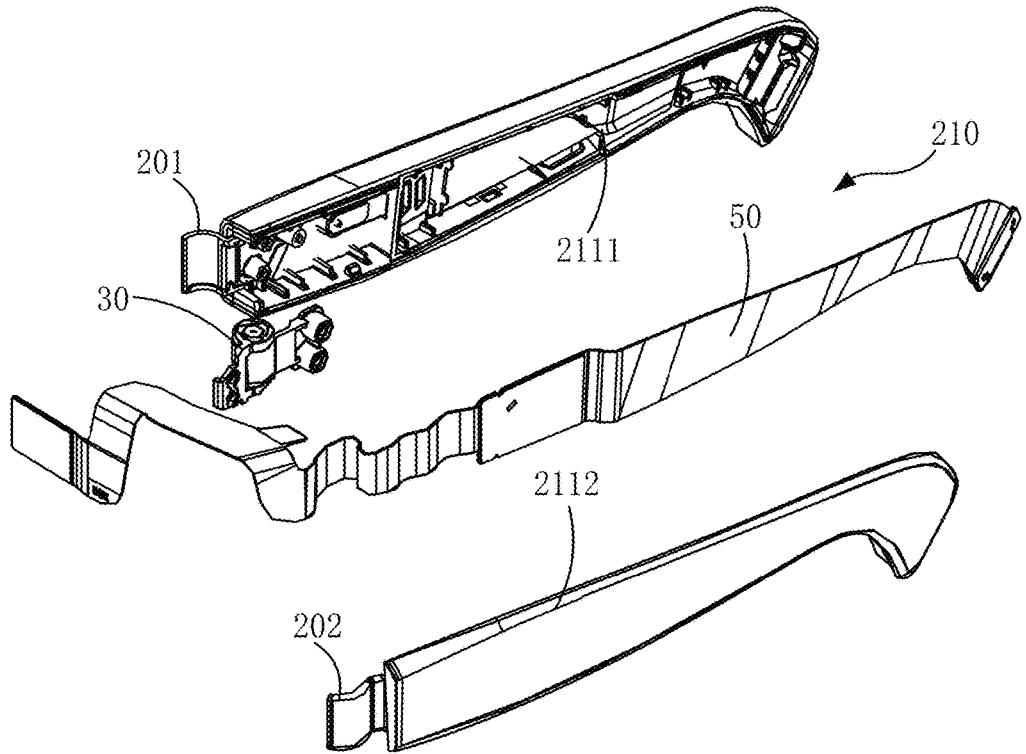
FIG. 26 is an exploded schematic structural view of a first wearable member according to the implementation of FIG. 25.
Figure 27:
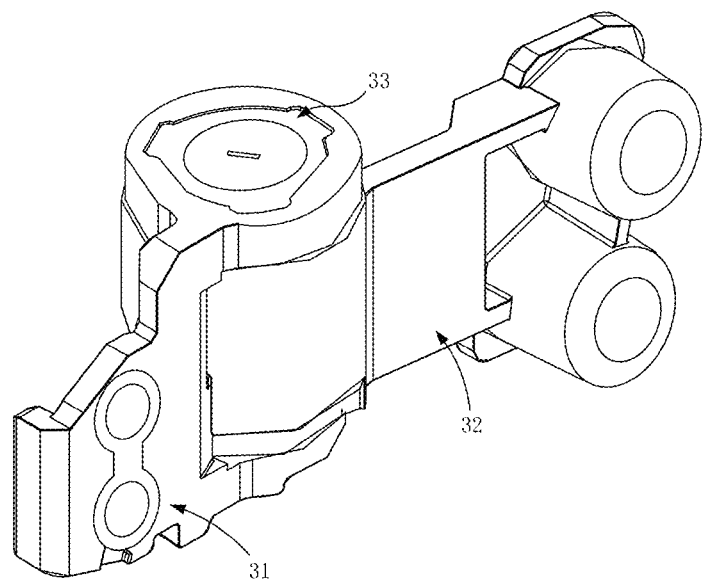
FIG. 27 is a schematic structural view of a connecting assembly in the implementation of FIG. 25.

Reference is made to FIGS. 26 and 27, where FIG. 26 is an exploded schematic structural view of the first wearable member 21 in the implementation of FIG. 25, and FIG. 27 is a schematic structural view of the connecting assembly 30 in the implementation of FIG. 25. The first wearable member may include a first housing 2111 and a second housing 2112. The first housing 2111 and the second housing 2112 cooperatively define an accommodating cavity 210. The connecting assembly 30 and the circuit board 50 are partially accommodated in the accommodating cavity 210. With reference to the implementation of FIG. 25, the connecting assembly 30 and the circuit board 50 are accommodated in the accommodating groove 120 and the accommodating cavity 210.

The connecting assembly 30 generally includes a first connector 31, a second connector 32 and a rotating mechanism 33. One of the first connector 31 and the second connector 32 is configured to connect the housing assembly 10, the other one the first connector 31 and the second connector 32 is configured to connect the wearable assembly 20, and the rotating mechanism 33 is connected with the first connector 31 and the second connector 32 respectively. For example, the first connector 31 is connected with the housing assembly 10, that is, the first connector 31 is accommodated in the accommodating groove 120; and the second connector 32 is connected with the wearable assembly 20, that is, the second connector 32 is accommodated in the accommodating cavity 210. Further, the first connector 31 can rotate relative to the second connector 32, so that the wearable assembly 20 can rotate relative to the housing assembly 10. Specifically, the rotating mechanism 33 is disposed between the first connector 31 and the second connector 32. One end of the first connector 31 is connected with the housing assembly 10, and the other end of the first connector 31 is connected with the rotating mechanism 33. One end of the second connector 32 is connected with the wearable assembly 20, and the other end of the second connector 32 is connected with the rotating mechanism 33, so that the first connector 31 and the second connector 32 can rotate relative to each other through the rotating mechanism 33, thereby enabling the wearable assembly 20 to rotate relative to the housing assembly 10.

Figure 28:
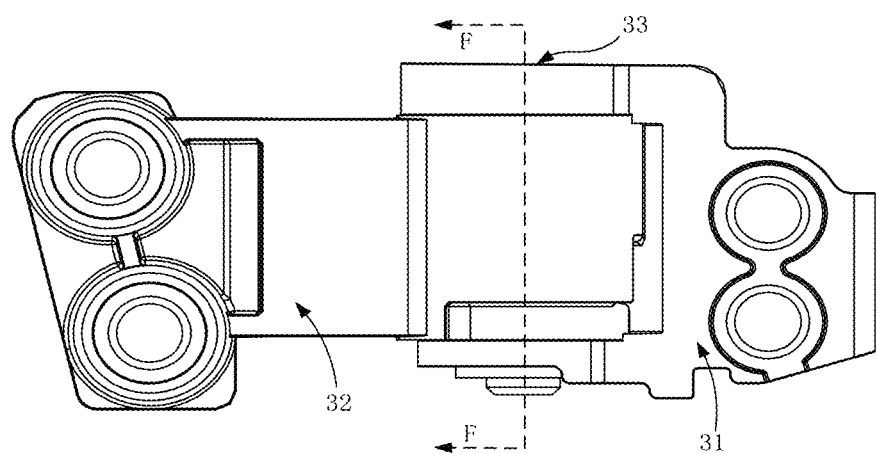
FIG. 28 is a front view of the connecting assembly in the implementation of FIG. 25.
Figure 29:
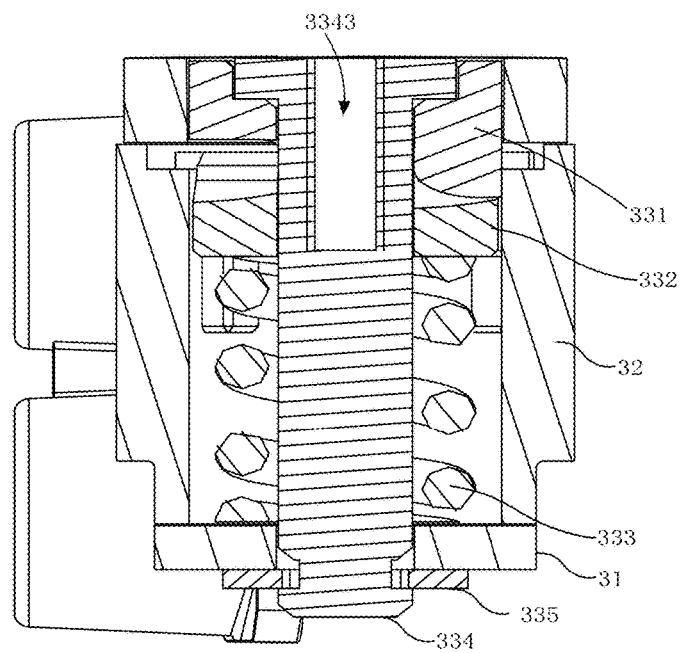
FIG. 29 is a schematic cross-sectional structural view of FIG. 28 taken along line F-F.
Figure 30:
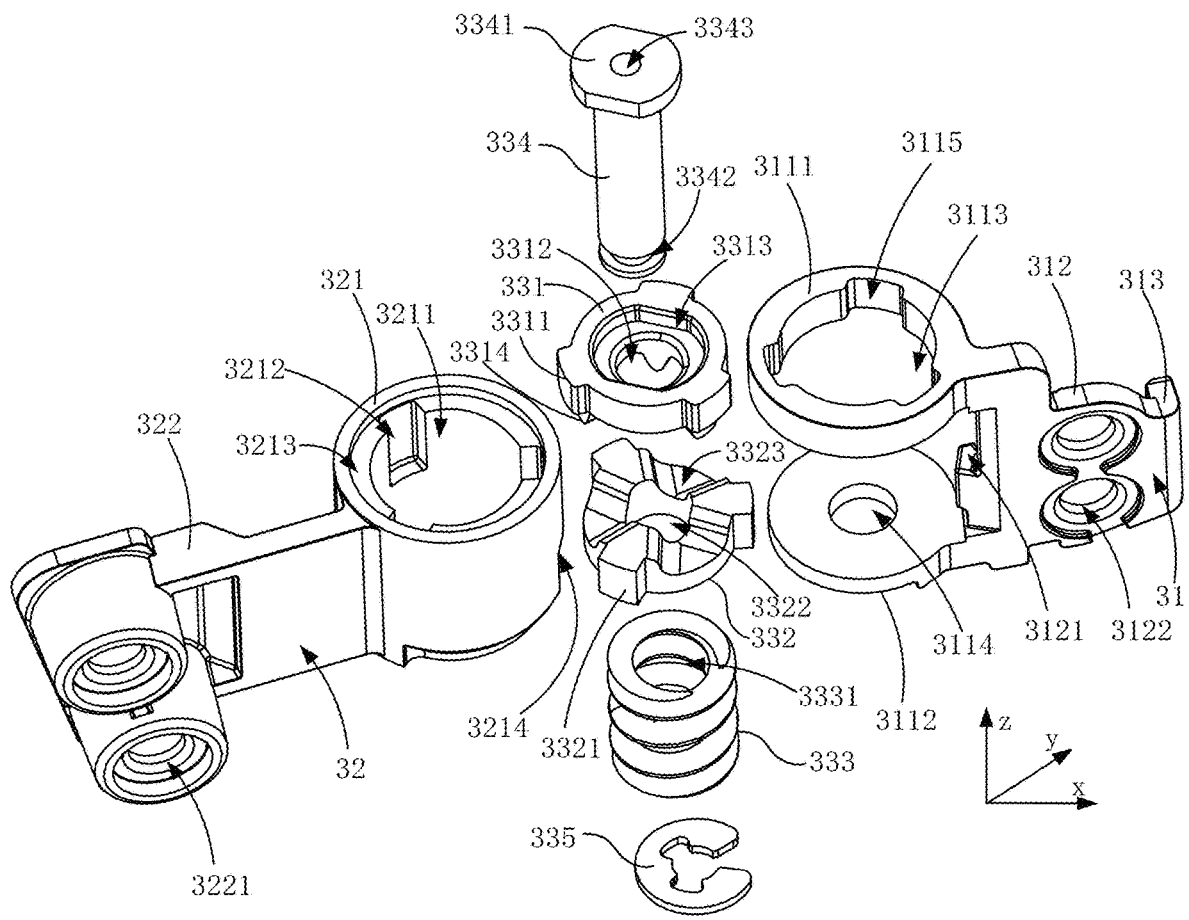
FIG. 30 is an exploded schematic structural view of the connecting assembly in the implementation of FIG. 25.

Reference is made to FIGS. 28-30, where FIG. 28 is a front view of the connecting assembly 30 in the implementation of FIG. 25, FIG. 29 is a schematic cross-sectional structural view of FIG. 28 taken along line F-F, and FIG. 30 is an exploded schematic structural view of the connecting assembly 30 in the implementation of FIG. 25. It should be noted that, FIG. 30 illustrates three directions x, y and z of the connecting assembly 30, which is mainly used to illustrate three planes xy, xz and yz, so as to facilitate corresponding descriptions hereinafter. The rotating mechanism 33 generally includes a first rotating member 331, a second rotating member 332, an elastic piece 333, a rotating shaft 334, and a fastener 335. The first rotating member 331 is connected with the first connector 31, and the second rotating member 332 is connected with the second connector 32. The second rotating member 332 can rotate relative to the first rotating member 331, so that the first connector 31 and the second connector 32 can rotate relative to each other. The first rotating member 331 may be a cam wheel, and the second rotating member 332 may be a recessed wheel. The cam wheel and the recessed wheel can cooperate to rotate and can achieve a certain torque, so that the first connector 31 and the second connector 32 can rotate relative to each other, thereby enabling the wearable assembly 20 to be unfolded or folded relative to the housing assembly 10.

The first connector 31 generally includes a first connecting portion 311, a first fixing portion 312, and a limiting portion 313. The first connecting portion 311 is configured to connect the first rotating member 331, the first fixing portion 312 is configured to be fixedly connected with the first connector 31 and the housing assembly 10, and the limiting portion 313 is disposed at an end of the first connector 31 away from the rotating mechanism 33. The limiting portion 313 is configured to cooperate with the housing assembly 10 to limit movement of the first connector 31, that is, the limiting portion 313 is configured to limit the position at which the first connector 31 is fixed to the housing assembly 10. The first connecting portion 311 and the limiting portion 313 are disposed at two opposite sides of the first fixing portion 312. One end of the first fixing portion 312 away from the first connecting portion 311 is bent and extends to form the limiting portion 313. The bending direction of the limiting portion 313 is substantially perpendicular to a plane where the first fixing portion 312 is located, so as to limit the first connector 31 in x direction and y direction.

The second connector 32 generally includes a second connecting portion 321 and a second fixing portion 322, the second connecting portion 321 is connected with the second rotating member 332, and the second fixing portion 322 is configured to fixedly connect the second connector 32 with the wearable assembly 20.

Specifically, the second rotating member 332 can rotate relative to the first rotating member 331, so that the second connecting portion 321 can rotate relative to the first connecting portion 311. The first connecting portion 311 includes a first connecting sub-portion 311 and a second connecting sub-portion 3112 spaced apart from each other, and the first connecting sub-portion 311 and the second connecting sub-portion 3112 are disposed at the same side of the first fixing portion 312. The first connecting sub-portion 3111 defines a first through-hole 3113, the second connecting sub-portion 3112 defines a second through-hole 3114, and the first through-hole 3113 and the second through-hole 3114 are coaxial. The first through-hole 3113 defines at least one first recess 3115 at an inner sidewall of the first through-hole 3113, the first rotating member 331 defines at least one first projection 3311 at an outer sidewall of the first rotating member 331, and the first recess 3115 and the first projection 3311 cooperate with each other to limit and fix the first rotating member 331 on the xy-plane. First recesses 3115 and first projections 3311 are disposed in one-to-one correspondence. It can be understood that, one of the first recess and the first projection may be disposed at the inner sidewall of the first through-hole, and the other one of the first recess and the first projection may be disposed at the outer sidewall of the first rotating member. Alternatively, some of the first grooves and some of the first projections may be disposed at the inner sidewall of the first through-hole, and some of the first grooves and the some of the first projections may be disposed at the outer sidewall of the first rotating member. The first rotating member 331 defines a fourth through-hole 3312, and the fourth through-hole 3312 is coaxial with the first through-hole 3113.

The second connecting portion 321 is disposed between the first connecting sub-portion 3111 and the second connecting sub-portion 3112 and is substantially cylindrical, and a cross section of the second connecting portion 321 on the xy-plane is annular. That is, the second connecting portion 321 defines a third through-hole 3211, and the third through-hole 3211 and the fourth through-hole 3312 are coaxial. The third through-hole 3211 defines at least one second recess 3212 at an inner sidewall of the third through-hole 3211, the second rotating member 332 defines at least one second projection 3321 at an outer sidewall of the second rotating member 332, and the second recess 3212 and the second projection 3321 cooperate with each other to limit and fix the second rotating member 332 on the xy-plane. Second recesses 3212 and second projections 3321 are disposed in one-to-one correspondence.

The second recess 3212 extends along an axial direction of the third through-hole 3211. In a direction parallel to the axial direction of the third through-hole 3211, a depth of the second recess 3212 is greater than a thickness of the second projection 3321, so that the second projection 3321 can move along Z direction. A bottom wall of the second recess 3212 limits the second projection 3321 in Z direction, so as to limit a movement displacement of the second rotating member 332 in Z direction. The second connecting portion 321 further defines a third recess 3213, and the third recess 3213 communicates with the third through-hole 3211 and the second recess 3212 respectively, that is, an annular end portion of the second connecting portion 321 is recessed to define the third recess 3213 for placing the first rotating member 331, thereby limiting the first rotating member 331 in direction. The second rotating member 332 defines a fifth through-hole 3322, and the fifth through-hole 3322 and the third through-hole 3211 are coaxial.

The first fixing portion 312 is provided with a first clamp member 3121 at a sidewall of the first fixing portion 312 adjacent to the first connecting portion 311, and the first clamp member 3121 is disposed between the first connecting sub-portion 3111 and the second connecting sub-portion 3112. The second connecting portion 321 is provided with a second clamp member 3214 fitted with the first clamp member 3121 at an outer sidewall of the second connecting portion 321, and the first clamp member 3121 is in fit with the second clamp member 3214 to enable the second connector 32 to rotate relative to the first connector 31 more stably, so that the connecting assembly 30 is not prone to shaking when rotating.

The elastic piece 333 is disposed between the second rotating member 332 and the second connecting sub-portion 3112, that is, one end of the elastic piece 333 is fixedly connected with the second rotating member 332 and the other end of the elastic piece 333 is fixedly connected with the second connecting sub-portion 3112, so as to provide an elastic force when the second rotating member 332 rotates relative to the first rotating member 331, thereby providing a rotation torque for the first rotating member 331 and the second rotating member 332. The elastic piece 333 may be a spring, a foam, or the like. It can be understood that, the elastic piece 333 defines a sixth through-hole 3331, and the sixth through-hole 3331 is coaxial with the fifth through-hole 3322. In implementations of the present disclosure, the elastic piece 333 is a spring, and the sixth through-hole 3331 is a central passage of the spring.

The rotating shaft 334 penetrates through the first rotating member 331, the second rotating member 332, the elastic piece 333, and the second connecting sub-portion 3112 in sequence, so that the first connector 31 and the second connector 32 can rotate around the rotating shaft 334. Specifically, the rotating shaft 334 penetrates through the fourth through-hole 3312, the fifth through-hole 3322, the sixth through-hole 3331, and the second through-hole 3114 in sequence, and the rotating shaft 334 is coaxial with each of the fourth through-hole 3312, the fifth through-hole 3322, the sixth through-hole 3331, and the second through-hole 3114. The rotating shaft 334 is provided with a snap portion 3341 at one end of the rotating shaft 334 close to the first connecting sub-portion 3111, and the rotating shaft 334 defines an annular snap groove 3342 at the other end of the rotating shaft 334 close to the second connecting sub-portion 3112.

Further, the first rotating member 331 defines a fourth recess 3313 on one side of the first rotating member 331 away from the second rotating member 332, and a bottom wall of the fourth recess 3313 communicates with the fourth through-hole 3312, that is, the fourth through-hole 3312 penetrates through the bottom wall of the fourth recess 3313. The snap portion 3341 is accommodated in the fourth recess 3313, an outer circumferential edge of the snap portion 3341 is fitted with an inner sidewall of the fourth recess 3313 so as to limit and fix the snap portion 3341 on the xy plane, and the bottom wall of the fourth recess 3313 limits and fixes the snap portion 3341 in the Z direction. When the rotating shaft 334 penetrates through the second through-hole 3114, the annular snap groove 3342 is located on one side of the second connecting sub-portion 3112 away from the first connecting sub-portion 3111. The fastener 335 is disposed on one side of the second connecting sub-portion 3112 away from the first connecting sub-portion 3111, and cooperates with the annular snap groove 3342 to fix the rotating shaft 334. The fastener 335 can be a snap spring.

In implementations of the present disclosure, the first rotating member 331 is provided with at least one sliding block 3314 on one side of the first rotating member 331 close to the second rotating member 332, the second rotating member 332 defines at least one sliding groove 3323 on one side of the second rotating member 332 close to the first rotating member 331, and the first rotating member 331 is slidably connected with the second rotating member 332 through cooperation of the sliding block 3314 and the sliding groove 3323. When the first rotating member 331 and the second rotating member 332 rotate relative to each other within a small angle range, the sliding block 3314 slides in the slide groove 3323. When the first rotating member 331 and the second rotating member 332 need to rotate relative to each other within a large angle range, the sliding block 3314 can slide out of the sliding groove 3323 and along a circumference of the second rotating member 332. In this case, the sliding block 3314 pushes the second rotating member 332 to move and compress the elastic piece 333, so that the elastic piece 333 twists along with rotation of the second rotating member 332, thereby forming a torque for relative rotation of the first rotating member 331 and the second rotating member 332, so that the first connector 31 and the second connector 32 can relatively stably rotate.

In other implementations, the sliding block 3314 is matched with the sliding groove 3323 in shapes, sliding blocks 3314 are evenly disposed on a periphery of the first rotating member 331, and the sliding groove 3323 are evenly disposed on a periphery of the second rotating member 332. During rotation, the sliding block 3314 pushes the second rotating member 332 to move in the axial direction of the rotating shaft 334, and when the rotation stops, the sliding block 3314 cooperates with the sliding groove 3323 to fix the first rotating member 331 and the second rotating member 332. It can be understood that one of the sliding block and the sliding groove may be disposed on the first rotating member, and the other one of the sliding block and the sliding groove may be disposed on the second rotating member; or, some sliding blocks and some sliding grooves are disposed on the first rotating member, and the other sliding blocks and the other sliding grooves are disposed on the second rotating member.

During assembling of the connecting assembly 30, the second connector 32 is first embedded into the first connector 31, so that the second connecting portion 321 is disposed between the first connecting sub-portion 3111 and the second connecting sub-portion 3112, and the third through-hole 3211 is coaxial with the first through-hole 3113 and the second through-hole 3114.

Then, the elastic piece 333 is placed in the third through-hole 3211 and abuts against the second connecting sub-portion 3112, and the second rotating member 332 is further placed in the third through-hole 3211 and connected with one end of the elastic piece 333 away from the second connecting sub-portion 3112. Herein, the second projection 3321 is embedded in the second recess 3212 and can move along the second recess 3212.

Then, the first rotating member 331 is disposed in the first through-hole 3113, that is, the first projection 3311 is embedded in the first recess 3115, and the first rotating member 331 abuts against a bottom wall of the third recess 3213 for limit. The sliding block 3314 is placed in the sliding groove 3323.

Next, the rotating shaft 334 penetrates through the fourth through-hole 3312, the fifth through-hole 3322, the sixth through-hole 3331, and the second through-hole 3114 in sequence, and one end of the rotating shaft 334 close to the second connecting sub-portion 3112 is fixed by the fastener 335. The other end of the rotating shaft 334 close to the first connecting sub-portion 3111 is placed in the fourth recess 3313 so as to complete assembling of the connecting assembly 30.

For example, the first connector 31 is connected with the housing assembly 10, and the second connector 32 is connected with the wearable assembly 20. The wearable assembly 20 rotates to drive the second connector 32 to rotate, so that the second connector 32 drives the second rotating member 332 to rotate, and then the second rotating member 332 cooperates with the first rotating member 331 to drive the elastic piece 333 to generate torsion to act on the housing assembly 10. The first connector 31 is fixed to the housing assembly 10, so that the first rotating member 331 and the rotating shaft 334 remain in a stationary state, and the second rotating member 332 can rotate around the rotating shaft 334, that is, the wearable assembly 20 can rotate around the rotating shaft 334, so as to enable the wearable assembly 20 to be folded or unfolded. In implementations of the present disclosure, the rotating shaft 334 defines a rotating-shaft fixing hole 3343, and the rotating-shaft fixing hole 3343 penetrates through the snap portion 3341 and is configured to fix the rotating shaft 334 to the housing assembly 10.

Figure 31:
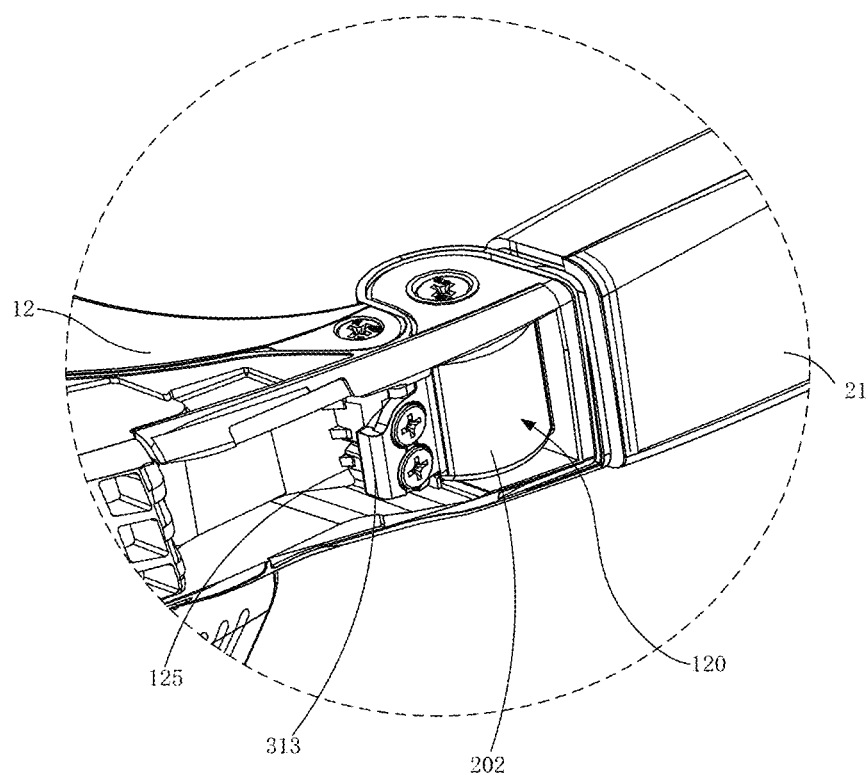
FIG. 31 is a schematic structural view of the connecting assembly connected with a housing assembly in the implementation of FIG. 25.
Figure 32:
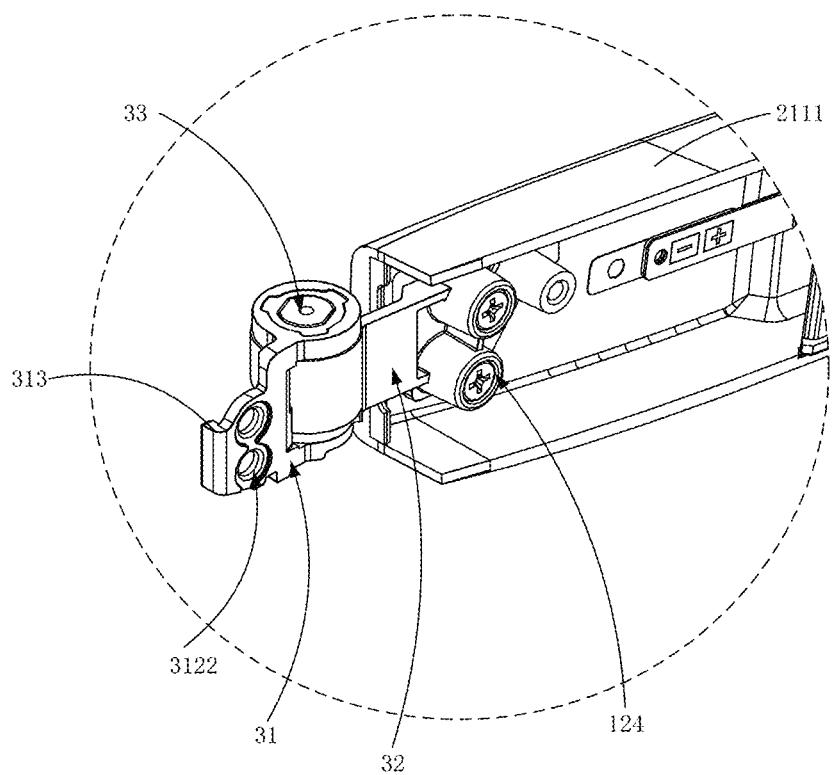
FIG. 32 is a schematic structural view of the connecting assembly connected with a wearable assembly in the implementation of FIG. 25.
Figure 33:
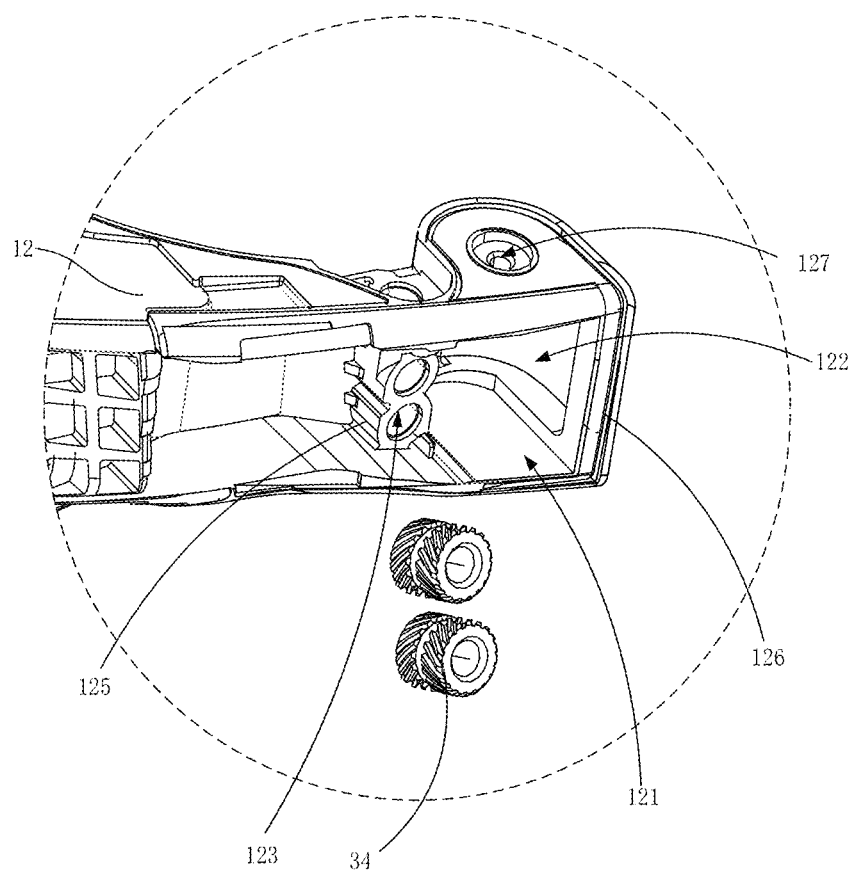
FIG. 33 is a partial enlarged schematic structural view of region G in the implementation of FIG. 25.

Reference is made to FIGS. 31-33, where FIG. 31 is a schematic structural view of the connecting assembly 30 connected with the housing assembly 10 in the implementation of FIG. 25, FIG. 32 is a schematic structural view of the connecting assembly 30 connected with the wearable assembly 20 in the implementation of FIG. 25, and FIG. 33 is a partial enlarged schematic structural view of region G in the implementation of FIG. 25. The first connector 31 is disposed in an accommodating groove 120, and the second connector 32 is disposed in an accommodating cavity 210.

For example, the middle housing 12 defines the accommodating groove 120. The accommodating groove 120 is defined in a first opening 121 and a second opening 122. The first opening 121 is defined on one side of the middle housing 12 close to the front housing 11, and the second opening 122 is defined at an end of the middle housing 12 close to the first wearable member 21. The connecting assembly 30 extends into the accommodating groove 120 from the second opening 122 to be fixed, in other words, the first connector 31 extends into the accommodating groove 120 from the second opening 122 and is fixed inside the middle housing 12. The rotating mechanism 33 is accommodated in the accommodating groove 120, and the front housing 11 covers the first opening 121 of the accommodating groove 120 to shield the connecting assembly 30, so that the wearable device 100 has consistent appearance.

Specifically, the first fixing portion 312 defines at least one first fixing hole 3122, the second fixing portion 322 defines at least one second fixing hole 3221, the middle housing 12 defines a third fixing hole 123 fitted with the first fixing hole 3122, and the first housing 2111 defines a fourth fixing hole 124 fitted with the second fixing hole 3221. An axis of the first fixing hole 3122 and an axis of the second fixing hole 3221 are each substantially perpendicular to a rotation axis of the rotating mechanism 33 (namely, the axis of the rotating shaft 334). In implementations of the present disclosure, the first fixing portion 312 and the middle housing 12 may be fixedly connected by a screw, and the second fixing portion 322 and the first housing 2111 may be fixedly connected by a screw, that is, a screw penetrates through the first fixing hole and the third fixing hole and a screw penetrates through the second fixing hole and fourth fixing hole to achieve a fixed connection. In other implementations, the first fixing portion 312 and the middle housing 12 may also be fixed in a manner such as a snap connection, an adhesive connection, and a bolt connection, and the second fixing portion 322 and the first housing 2111 may also be fixed in a manner such as a snap connection, an adhesive connection, and a bolt connection.

A clamp portion 125 is further disposed in the middle housing 12, and the clamp portion 125 is buckled with the limiting portion 313. When the first wearable member 21 rotates around the rotating mechanism 33, a tension is generated on the connecting assembly 30. In the process of the wearable assembly 20 being repeatedly folded or unfolded for many times, the connecting assembly 30 will be loosened, such that the stability of the wearable assembly 20 will be affected when the wearable assembly 20 is unfolded or folded, and a gap between the housing assembly 10 and the wearable assembly 20 will be increased in the process of the wearable assembly 20 being folded or unfolded. According to implementations of the present disclosure, the clamp portion 125 is buckled with the limiting portion 313, the connecting assembly can be prevented from loosening due to the rotational tension, thereby improving the stability of the wearable assembly 20 when the wearable assembly 20 is unfolded or folded.

It can be understood that, an end of the first fixing portion 312 is bent towards the clamp portion 125 to form the limiting portion 313, and the limiting portion 313 is disposed on one side of the clamp portion 125 away from the accommodating groove 120. The limiting portion 313 can serve as a stopper to prevent looseness during rotation.

In some other implementations, the middle housing 12 is generally made of a plastic material, and the structural strength of the plastic material is limited. When the third fixing hole 123 is defined on the middle housing 12 made of the plastic material, the structural strength is not enough. Based on this, the connecting assembly 30 in implementations of the present disclosure further includes a first metal piece 34 disposed in the third fixing hole 123 to enhance the structural strength.

Specifically, the first metal piece 34 is disposed corresponding to the third fixing holes 123, that is, one first metal piece 34 is disposed in each of the third fixing holes 123. The first metal piece 34 can be fitted with a screw for fixing. Preferably, the first metal piece 34 may have a nut structure. Further, the first metal piece 34 may be disposed in the third fixing hole 123 by means of hot melting. For example, the first metal piece 34 is fixed by using a hot-melting jig, then the first metal piece 34 is heated, and the heated first metal piece 34 is aligned with the third fixing hole 123 for hot melting, so that ends of the first metal piece 34 is flush with ends of the third fixing hole 123.

In implementations of the present disclosure, a limiting rib 126 is disposed at a boundary between the first opening 121 and the second opening 122, and the rotating mechanism 33 is disposed between the limiting rib 126 and the clamp portion 125, such that the rotating mechanism 33 can be limited in x direction. The accommodating groove 120 defines a fifth fixing hole 127 in a sidewall of the accommodating groove 120 and the fifth fixing hole 127 corresponds to the rotating-shaft fixing hole 343. The rotating-shaft fixing hole 3343 and the fifth fixing hole 127 cooperate to fix the rotating shaft 334, so as to limit the rotating mechanism 33 in the accommodating groove 120. The rotating shaft 334 can be fixed by a screw penetrating through the fifth fixing hole 127 and the rotating-shaft fixing hole 343.

In order to avoid exposing internal structures when the wearable assembly is folded or unfolded, the wearable assembly is further provided with shields. Specifically, reference is made to FIG. 26 again, the wearable body 211 of the first wearable member 21 is provided with a first shield 201 and a second shield 202 at an end of the wearable body 211 close to the housing assembly 10. One of the first shield 201 and the second shield 202 is disposed at the end of the first housing 2111 close to the housing assembly 10, and the other of the first shield 201 and the second shield 202 is disposed at an end of the second housing 2112 close to the housing assembly 10.

The first shield 201 and the second shield 202 is covered on one side of the connecting assembly 30, and the second shield is covered on the other side of the connecting assembly 30 opposite to said one side, so as to shield the connecting assembly 30. The shape of the first shield 201 is adapted to a part of a peripheral edge of the second connecting portion 321, and the shape of the second shield 202 is adapted to a part of the peripheral edge of the second connecting portion 321, so that the second connecting portion 321 can rotate in a space enclosed by the first shield 201 and the second shield 202.

For example, the first shield 201 extends from the end of the first housing 2111 into the accommodating groove 120, and the second shield 202 extends from the end of the second housing 2112 into the accommodating groove 120. The first shield 201 disposed on one side of the connecting assembly 30 and the second shield 202 is disposed at the other side of the connecting assembly 30 opposite to said one side, and an orthographic projection of the first shield 201 covers one side of the connecting assembly 30, and an orthographic projection of the second shield 202 on the xy-plane covers the other side of the connecting assembly 30 opposite to said one side. It can be understood that, during rotation of the wearable assembly 20, the first shield 201 and the second shield 202 can rotate along an outer periphery of the connecting assembly 30, and cooperate with the sidewall of the accommodating groove 120 to shield the connecting assembly 30, so as to prevent the connecting assembly 30 from being exposed.

Further, the wearable device 100 further includes a circuit board 50, where the circuit board 50 is connected with internal components of the housing assembly 10 and with internal components of the wearable assembly 20. For example, the circuit board 50 is configured to communicate with a host 80 in the housing assembly 10 and with a loudspeaker assembly in the wearable assembly 20. Therefore, the circuit board 50 is disposed inside the wearable assembly 20 and extends into the housing assembly 10 so as to perform signal transmission. The circuit board 50 is disposed on one side of the connecting assembly 30 away from the first housing 2111 and is connected with the first housing 2111. Preferably, the circuit board 50 may be fixedly connected with the first housing 2111 through a screw or a bolt. For example, the circuit board 50 defines a screw hole, and a screw penetrates through the screw hole and the fourth fixing hole 124 in sequence and is tightened and fixed. It can be understood that, the circuit board 50 may be a flexible printed circuit (FPC) board, so as to facilitate bending.

During assembling, the second connector 32 is first fixed in the first wearable member 21, that is, a screw penetrates through the second fixing hole 3221 and the fourth fixing hole 124 to fixedly connect the second fixing portion 322 with the first housing 2111. Then, the circuit board 50 is fixedly disposed on one side of the second connector 32 away from the first housing 2111, that is, a screw penetrates through the screw hole of the circuit board 50 and the fourth fixing holes 124 to fixedly connect the circuit board 50 with the first housing 2111, and the circuit board 50 covers one side of the connecting assembly 30 away from the first housing 2111. Then, the second housing 2112 is buckled with the first housing 2111 to complete assembling of the first wearable member 21.

In addition, the first connector 31 and the circuit board 50 penetrate through the second opening 122, so that the first connector 31 and the rotating mechanism 33 are disposed in the accommodating groove 120, and the rotating mechanism 33 is disposed between the limiting rib 126 and the clamp portion 125. The circuit board 50 is bent along the limiting rib 126 to expose the first fixing hole 3122, and a screw penetrates through the first fixing hole 3122 and the third fixing hole 123 to fixedly connect the first fixing portion 312 with the middle housing 12. The limiting portion 313 and the clamp portion 125 cooperate to limit movement of the first connector 31, and then a screw penetrates through the fifth fixing hole 127 and the rotating-shaft fixing hole 343 to fix the rotating shaft 334.

In addition, the circuit board 50 is fixed in the accommodating space defined by the middle housing 12 and the rear housing 13, and is connected with the host 80. Then, the front housing 11 is buckled with the middle housing 12, that is, the front housing 11 covers the first opening 121 of the accommodating groove 120 and abuts against the first wearable member 21. In this way, assembling and hiding of the connecting assembly 30 at the end of the housing assembly 10 is completed, and the connecting assembly 30 is unable to be seen in appearance.

In the wearable device provided in implementations of the present disclosure, the connecting assembly is hidden and assembled in the wearable device, which not only satisfies folding and storing requirements of the wearable device, but also ensures an elegant appearance. In this way, internal mechanism is unable to be exposed while achieving a function of semi-automatic folding and unfolding, thereby providing a better human-machine experience. In addition, the connecting assembly is fixed by screws in multiple directions, and the overall structural stability is good.

It can be understood that a main board of the wearable device is disposed in an accommodating space defined by the middle housing 12 and the rear housing 13, a circuit system of the wearable device is installed on the main board, and the main board is provided with a series of joints for connecting devices such as a processor, a memory, and an external device. The most important constituent component on the main board of the wearable device is a chipset. The chipset provides a universal platform for the main board to be connected with different devices, and controls communication between different devices. The chipset can provide additional functions for the mainboard, such as integrated graphics, infrared communication technology, Bluetooth, etc. The mainboard is electrically connected with a battery disposed in the wearable device to obtain power supply.

Figure 34:
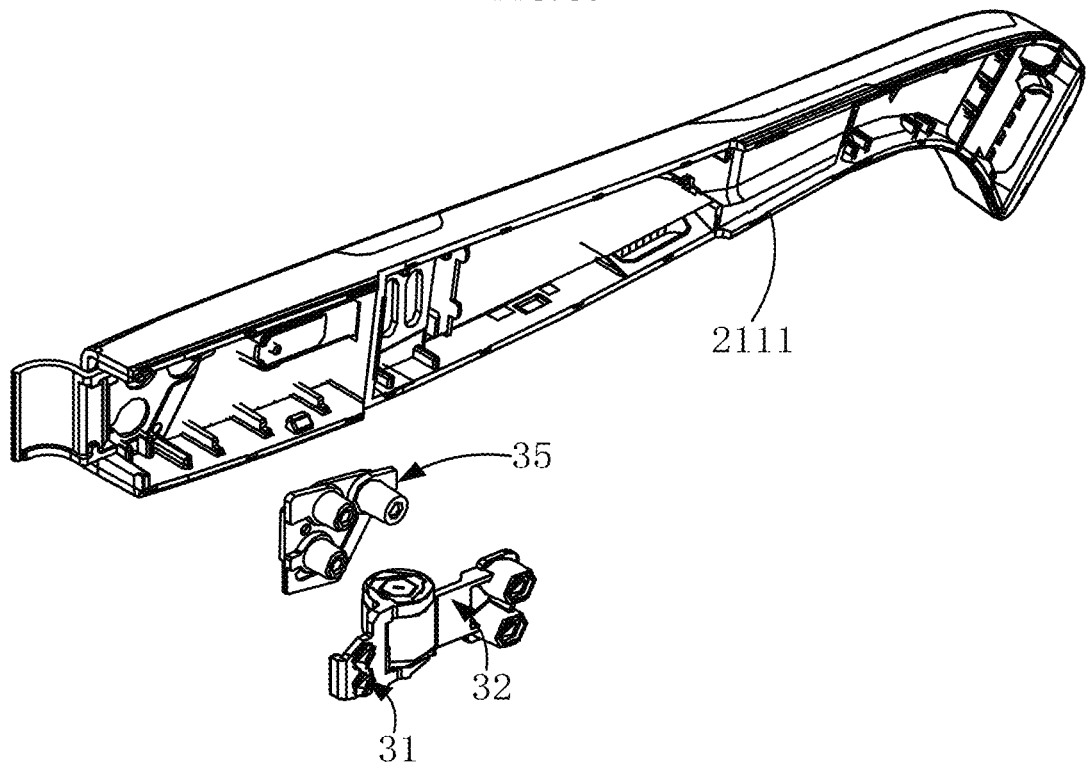
FIG. 34 is another schematic structural view of the connecting assembly in the implementation of FIG. 25.
Figure 35:
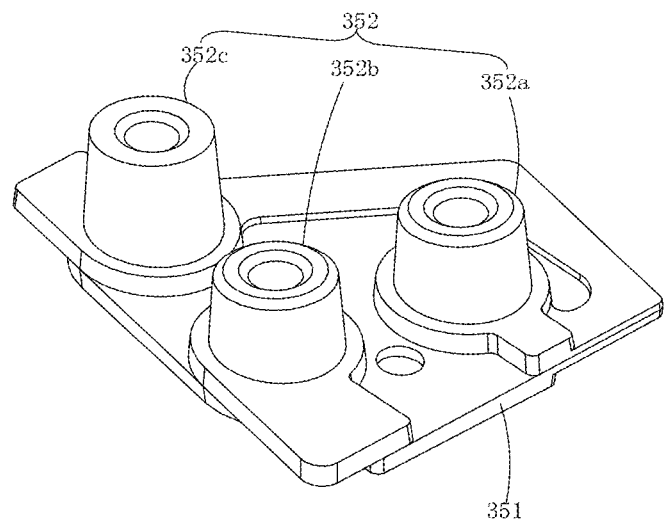
FIG. 35 is a schematic structural view of a second metal piece in the implementation of FIG. 34.
Figure 36:
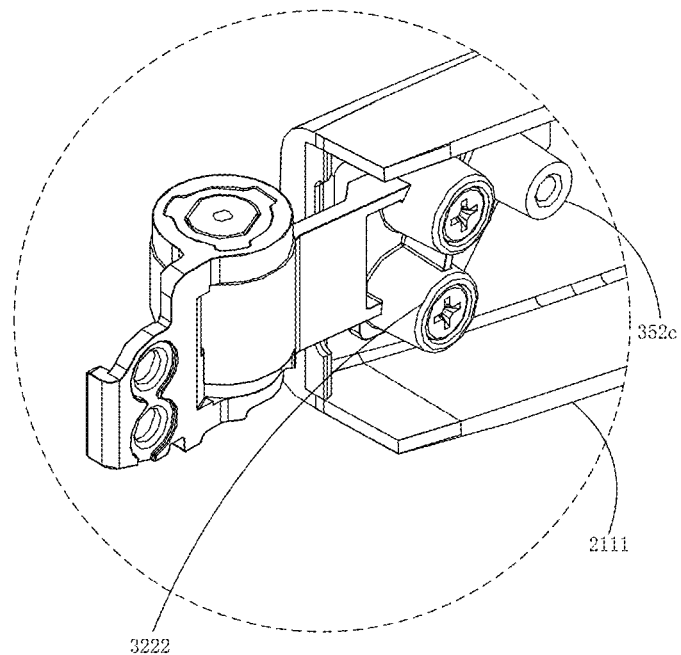
FIG. 36 is a partial connection-state view of a connecting assembly in the implementation in FIG. 34.

Reference is made to FIGS. 34-36, FIG. 34 is another schematic structural view of the connecting assembly 30 in the implementation of FIG. 25, FIG. 35 is a schematic structural view of the second metal piece 35 in the implementation of FIG. 34, and FIG. 36 is a partial connection-state view of the connecting assembly 30 in the implementation of FIG. 34. The difference between the implementation of the present disclosure and foregoing implementations lies in that the connecting assembly 30 further includes a second metal piece 35.

It can be understood that the first housing and the second housing of the wearable assembly are generally made of plastic materials, so as to provide a relatively light use experience. However, the structural strength of plastics is limited. In order to meet the strength requirement of the wearable assembly during movement, in implementations of the present disclosure, the second metal piece 35 is embedded into the first housing and the connecting assembly is fixedly connected with the second metal piece 35, such that the strength requirement of the wearable assembly during movement can be met.

The second metal piece 35 and the first housing 2111 are integrally formed, for example, the second metal piece 35 and the first housing 2111 may be integrally formed through an injection molding process. In implementations of the present disclosure, a combination of the second metal piece 35 and the first housing 2111 can be integrally formed through an injection molding process, and then the first housing 2111 and the wearable cover 212 are integrally formed through a secondary injection molding process.

The second metal piece 35 includes a substrate 351 and multiple first bolts 352 disposed on the substrate 351. The multiple first bolts 352 are disposed on the same side of the substrate 351. Specifically, the substrate 351 is embedded in the first housing 2111 and is flush with the inner surface of the first housing 2111, so as to prevent the substrate 351 from exceeding the inner surface of the first housing 2111 and occupying excessive space. The multiple first bolts 352 are disposed on one side of the substrate 351 close to the second housing 2112, and are used to cooperate with and fix the second connector 32 and used to fix the circuit board 50. Multiple second bolts 3222 are disposed on the second fixing portion 322 of the second connector 32, and the multiple second bolts 3222 are in fit and fixed to a part of the first bolts 352. The first bolt 352 and the second bolt 3222 each defines a screw hole, and the screw hole of the first bolt 352 and the screw hole of the second bolt 3222 are coaxially, so as to facilitate fastening by using a screw.

Specifically, the multiple second bolts 3222 are disposed on one side of the second fixing portion 322 away from the first housing 2111 and sleeved on a part of the first bolts 352. In implementations of the present disclosure, three first bolts 352 are disposed, which are a first bolt 352a, a first bolt 352b, and a first bolt 352c, respectively. Two second bolts 3222 are disposed, which are corresponding to the first bolt 352a and the first bolt 352b, respectively. The first bolts 352c are configured for fixing the circuit board 50. That is, the two second bolts 3222 are respectively sleeved on the first bolt 352a and the first bolt 352b to reduce the space occupied by the first bolts 352 and the second bolts 3222. In other words, the number of the first bolts 352 is greater than the number of the second bolts 3222. The second bolts 3222 are sleeved on a part of the first bolts 352 for connecting the second metal piece 35 with the second connecting portion 32, and the other part of the first bolts 352 is configured to connect other components such as the circuit board 50.

During assembling, the second bolt 3222 is sleeved on the first bolt 352, and then a screw penetrates through the screw hole of the first bolt 352 and the screw hole of the second bolt 3222 to fixedly connect the second metal piece 35 with the second connecting portion 32. Then, the circuit board 50 is placed on one side of the second metal piece 35 close to the second housing 2112, the screw holes of the circuit board 50 are aligned with remaining first bolts 352, and then are fixed by screws, and finally the first housing 2111 is buckled with the second housing 2112.

In implementations of the present disclosure, the second metal piece is integrally formed with the first housing, such that the strength requirement of the wearable assembly during movement can be met. In addition, multiple first bolts are disposed on the second metal piece to be connected with components such as the second connector and the circuit board, so as to prevent the second metal piece from occupying too much space inside the first wearable member.

A wearable device will be described hereinafter, and reference is made to FIG. 37 which is schematic structural view of a wearable device 200 provided in other implementations of the present disclosure. The wearable device 200 may be, for example, VR glasses, AR glasses, MR glasses, or other smart glasses that can be worn on the head. The wearable device 200, for example, may be in the shape of glasses as illustrated in FIG. 1 and FIG. 2 and includes a housing assembly 10, a wearable assembly 20, and a connecting assembly 30, etc. The housing assembly 10 accommodates an optical-mechanical assembly and a camera assembly, etc. It should be noted that a shape and/or a style of the wearable device 200 is not limited in the present disclosure. FIGS. 1 and 2 are only examples, but do not limit the present disclosure.

Figure 37:
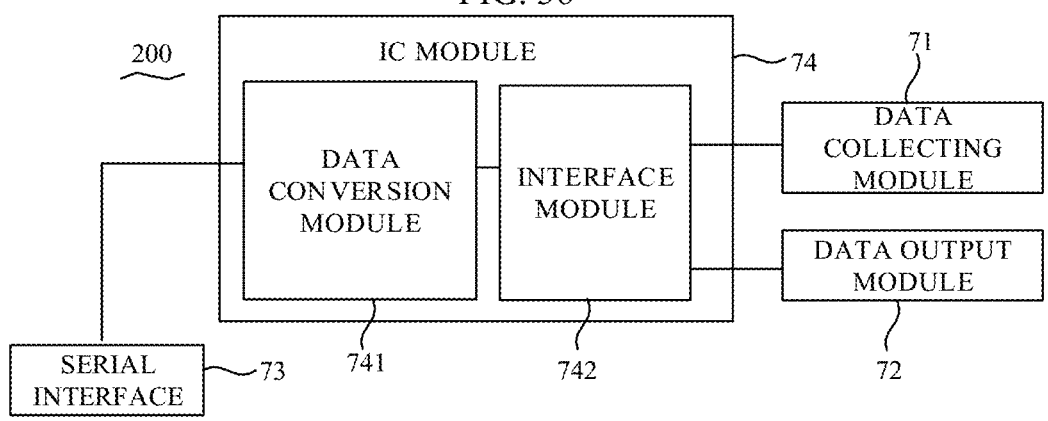
FIG. 37 is a schematic structural view of a wearable device in other implementations of the present disclosure.

Please refer to FIG. 37, the wearable device 200 may include a data collecting module 71, a data output module 72, a serial interface 73, and an integrated circuit (IC) module 74.

The serial interface 73 may be, for example, a USB interface meeting the USB 2.0 specification, the USB 3.0 specification, and the USB 3.1 specification. The serial interface 73 may include a micro USB interface or a USB TYPE-C interface. In addition, the serial interface 73 may also be the signal interface 215 in FIG. 4. The serial interface 73 may be any other types of serial interfaces that can be used for serial data transmission.

The IC module 74 may include a data conversion module 741 and an interface module 742. The data conversion module 741 is connected with the data collecting module 71 via the interface module 742 and connected with the data output module 72 via the interface module 742. The IC module 74 may be accommodated in the housing assembly 10 and/or the wearable assembly 20 of previous implementations.

The data conversion module 741 is configured to perform serial conversion on data that is collected from the data collecting module 71 through the interface module 742, and output serial data converted through the serial interface 73, so as to make the serial data converted be processed, for example, transmit the serial data converted to an external device such as an electronic device for processing.

The data conversion module 741 is further configured to convert serial data received via the serial interface 73 so as to convert the serial data received into interface data matched with an interface protocol of the interface module 742, and transmit interface data converted to the data output module 72 via the interface module 742 so as to output the interface data converted to the user via the data output module 72.

The IC module 74 may be implemented, for example, as an application specific integrated circuit (ASIC) data integration processing chip, or a field programmable gate array (FPGA).

For the wearable device provided in implementations of the present disclosure, an integrated circuit chip is adopted in the wearable device, the wearable device collects data via the interface module in the integrated circuit chip, and centrally converts data received from a host unit and the data collected through the data conversion module. On one hand, space and volume of the wearable device can be greatly reduced, and lightweight and thinning of the wearable device can be realized; on the other hand, power consumption of a chip can also be reduced, heating of the wearable device can be reduced, and user experience can be improved. In addition, centralized conversion may also reduce overall data-processing latency of the wearable device.

Figure 38:
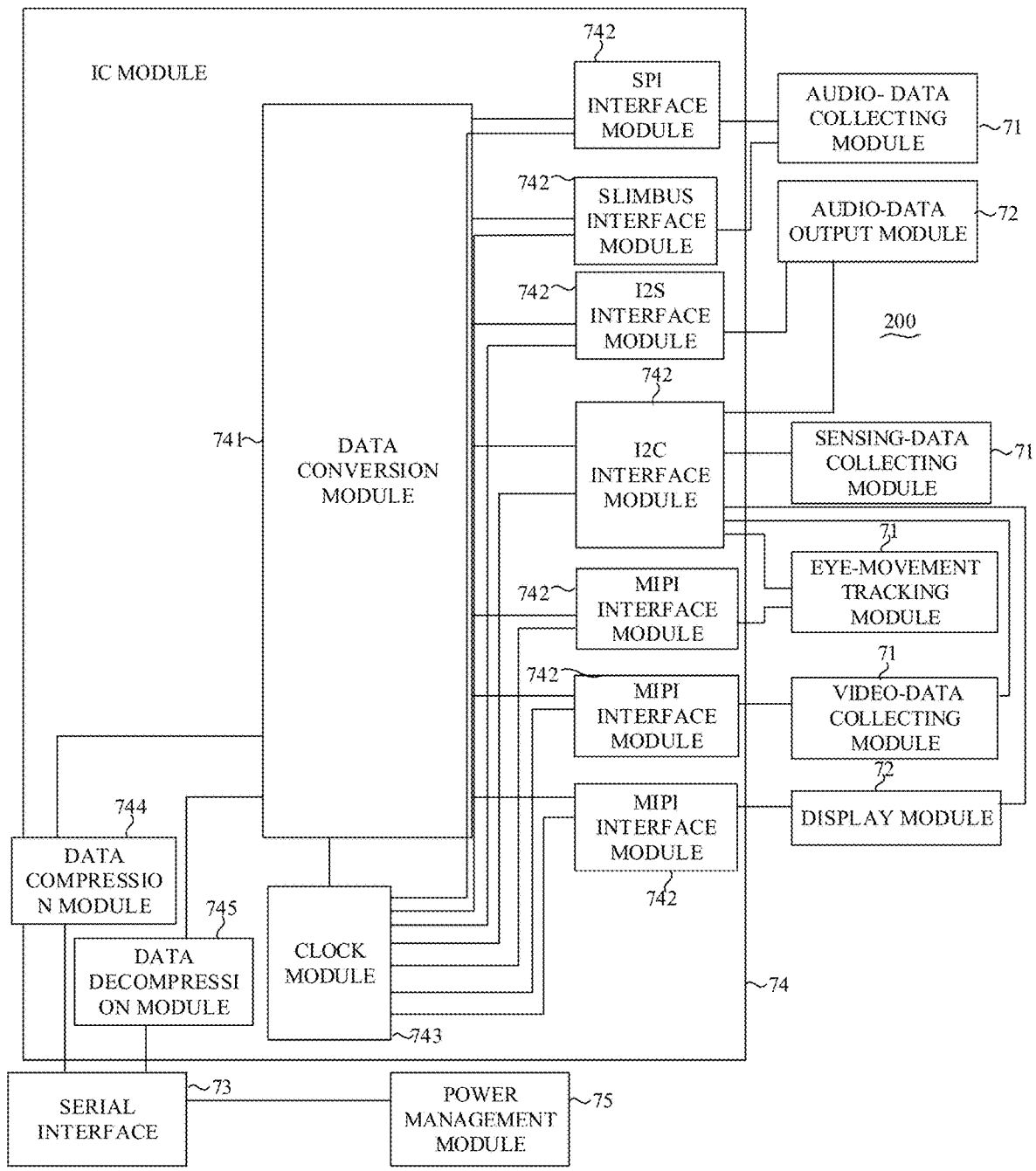
FIG. 38 is a schematic structural view of the wearable device in an implementation of FIG. 37 according to another implementation.

Reference is made to FIG. 38, which is a schematic structural view of the wearable device 200 in an implementation of FIG. 37 according to another implementation of the present disclosure. The IC module 74 in the wearable device 200 may include multiple interface modules 742. For example, the multiple interface modules 742 may be an I2C interface module, an SPI interface module, an I2S interface module, a serial low-power inter-chip media Bus (SLIMbus) interface module, and a mobile industry processor interface (MIPI) interface module.

The I2C interface module communicates with a connected module via an I2C bus. The I2C bus is a simple and bidirectional two-wire-system synchronous serial bus and only two wires are needed for information transmission between components connected with the bus. A master component is configured to start the bus to transmit data and generate a clock to enable a component for transmission. Any component to be addressed is considered as a slave component. A master-slave relationship and a transmit-receive relationship for the bus are not constant, and depend on a direction of current data transmission. When the master component is to transmit data to the slave component, the master component first addresses the slave component, then actively transmits the data to the slave component, and finally the master component terminates the data transmission. When the master component is to receive data from the slave component, the slave component first addresses the master component, then the master component receives data transmitted from the slave component, and finally the master component terminates the reception process. In this case, the master component is responsible for generating a timing clock and terminating data transfer. Generally, the I2C interface module is a control interface for transmitting control signaling.

The SPI interface module communicates with a connected module via an SPI bus. The SPI bus is a high-speed full-duplex synchronous communication bus. The SPI communication principle is simple, and the SPI bus operates in a master-slave mode. In the master-slave mode, there are usually one master device and one or more slave devices, and four lines are required for data input of the master device, data output of the master device, clock signal transmission, and enable-signal transmission output by the master device, respectively. Generally, the SPI interface is also a control interface for transmitting control signaling.

The I2S interface module communicates with the connected module via the I2S bus, and the I2S bus is a bus standard developed for transmission of audio data between digital audio devices such as CD players, digital audio processors, and digital television sound systems. A design of using independent lines for transmission of clock and transmission of a data signal respectively is adopted. By separating data from a clock signal, distortion induced by a time difference is avoided, the cost of purchasing a professional device resistant to audio jitter is saved for a user, and this design is widely applied to various multimedia systems. A standard I2C bus consists of 3 serial lines: a time division multiplexing (TDM) data line, a word select line, and a clock line.

The SLIMbus interface module communicates with a connected module via an SLIMbus bus. The SLIMbus bus is an audio interface specified by the MIPI Alliance, is used to connect a baseband processor or an application processor with an audio chip, and is generally used to transmit audio data. One end of the SLIMbus bus is connected with one interface device and the other end of the SLIMbus bus is connected with one or more functional devices. The interface device is connected with the functional devices via a one-to-many port. The port may be for input only, for output only, or bidirectional. The SLIMbus bus supports dynamic terminating and restarting, and supports all sampling frequencies.

The MIPI interface module communicates with a connected module according to an MIPI interface specification, and MIPI is an open standard and is a description developed by the MIPI Alliance for a mobile application processor. MIPI aims to standardize interfaces inside the mobile phone, such as a camera interface, a display screen interface, and a radio frequency/baseband interface, so as to reduce complexity of the mobile phone design and increase flexibility of the mobile phone design. The MIPI multimedia description is mainly divided into three layers, that is, an application layer, a protocol layer, and a physical layer. The MIPI multimedia description is mainly applied to interfaces of devices such as a camera and a display, which may include a camera serial interface (CSI), a display serial interface (DSI), and the like.

As illustrated in FIG. 38, the wearable device 200 may include multiple data collecting modules 71, such as an audio-data collecting module, a video-data collecting module (a camera assembly in foregoing implementations), an eye-movement tracking module, and a sensing-data collecting module.

The audio-data collecting module may include, for example, a microphone and an audio codec. The audio codec performs audio encoding on data collected by the microphone.

For example, the video-data collecting module may include a camera, such as a lens of an ordinary camera, and an infrared ray (IR) lens of an IR camera.

Eye-movement tracking is a scientific application technology. When a person looks at different directions, eyes change slightly, these changes result in features, that can be extracted by a computer though image capture or scanning. As such, changes of eyes can be tracked in real time, a state and requirement of the user can be predicted, and a response is made for the state and requirement of the user, so as to achieve the purpose of using eyes to control a device. For example, the user can flip a page without touching a screen. In principle, eye-movement tracking is mainly to study acquisition, modelling and simulation of eye-movement information, and has a wide range of applications. In addition to an eye tracker, a device for acquiring eyeball movement information may also be an image collecting device, or even a camera on a general computer or mobile phone, which can also realize eyeball tracking under the support of software.

The eye-movement tracking module, as described above, may include the eye tracker, the image collecting device, and the like.

The sensing-data collecting module may include, for example, a proximity sensor, an inertial measurement unit (IMD), an ambient light sensor, and the like.

The proximity sensor (for example, a distance sensor disposed on the first FPC523) is a general term of sensors for the purpose of detection without a contact with a detection object, instead of a contact detection mode such as a limit switch. The proximity sensor can convert movement information and presence information of the detection object into electrical signals. A detection principle of an inductive proximity sensor is to detect magnetic loss caused by an eddy current generated on a surface of a conductor through an influence of an external magnetic field. An alternating current magnetic field is generated in a detection coil, and a change in impedance caused by an eddy current generated in a metal piece of the object is detected. In other implementations, the proximity sensor may also include an aluminum detection sensor that detects a frequency phase component, an all-metal sensor that detects only an impedance change component through a work coil, or the like.

The IMD is used for measuring a three-axis attitude angle (or angular rate) and AN acceleration of an object. Generally, the IMU includes three single-axis accelerometers and three single-axis gyroscopes. An accelerometer detects an acceleration signal of an object at three independent axes in a carrier coordinate system, and a gyroscope detects an angular speed signal of a carrier relative to a navigation coordinate system. The angular speed and acceleration of the object in a three-dimensional space are measured, and the posture of the object is thus calculated.

A visible light sensor uses visible light as a detection object and converts visible light into an output signal. The visible light sensor is a device or apparatus which can sense regularly the measured and converts it into an available output signal according to a certain rule.

Reference is made to FIG. 38, for example, the audio-data collecting module 71 may be coupled with the data conversion module 741 through the SLIMbus interface module 742 and the SPI interface module 742. A control signal may be transmitted between the audio-data collecting module 71 and the SPI interface module 742, and audio data may be transmitted between the audio-data collecting module 71 and the SLIMbus interface module 742.

The video-data collecting module 71 may be coupled with the data conversion module 741 via the MIPI interface module 742 and the I2C interface module 742. Video data may be transmitted between the video-data collecting module 71 and the MIPI interface module 742, and a control signal may be transmitted between the video-data collecting module 71 and the I2C interface module 742.

The eye-movement tracking module 71 may be, for example, coupled with the data conversion module 741 via the MIPI interface 742 and the I2C interface module 742. Eye-movement tracking data can be transmitted between the eye-movement tracking module 71 and the MIPI interface module 742, and a control signal may be transmitted between the eye-movement tracking module 71 and the I2C interface module 742.

The sensing-data collecting module 71 may be coupled with the data conversion module 741 through the I2C interface module 742. Sensing data may be transmitted between the sensing-data collecting module 71 and the I2C interface module 742, and in addition, a control signal may also be transmitted between the sensing-data collecting module 71 and the I2C interface module 742.

Reference continues to be made to FIG. 38, for example, the wearable device 200 can also include multiple data output modules 72. The multiple data output modules 72 may, for example, include a display module 72 and an audio-data output module 72. The display module 72 may be, for example, the optical-mechanical assembly in foregoing implementations.

The audio-data output module 72 may include, for example, a loudspeaker (the loudspeaker assembly in the wearable assembly), and/or an earphone interface to output audio data through an external earphone.

The display module 72 may be coupled with the data conversion module 741 via the MIPO interface module 742 and the I2C interface module 742. Video data to be displayed may be transmitted between the display module 72 and the MIPO interface module 742, and a control signal may be transmitted between the display module 72 and the I2C interface module 742.

The audio-data output module 72 may be coupled with the data conversion module 741 via the I2S interface module 742 and the I2C interface module 742. Audio data to be output can be transmitted between the audio-data output module 72 and the I2S interface module 742, and a control signal can be transmitted between the audio-data output module 72 and the I2C interface module 742.

In addition, the IC module 74 may include a clock module 743 connected with the data conversion module 741 and various interface modules 742 respectively to output clock signals to various modules.

In some implementations, the IC module 74 may also include a data compression module 744 and a data decompression module 745.

The data compression module 744 is connected between the data conversion module 741 and the serial interface 73, and the data decompression module 745 is connected between the data conversion module 741 and the serial interface 73.

The data compression module 744 is configured to compress serial data to be output, before the data conversion module 741 outputs converted serial data through the serial interface 73, and to output serial data compressed through the serial interface 73.

The data decompression module 745 is configured to decompress serial data received through the serial interface 73 before the data conversion module 741 receives the serial data through the serial interface 73, and to transmit the decompressed serial data to the data conversion module 741 for conversion.

By compressing data to be transmitted, transmission bandwidth can be saved, and a transmission rate can be improved, thereby further ensuring real-time performance of data and improving user's experience. However, it should be noted that, data compression/decompression algorithm adopted is not limited in the present disclosure, and a specific algorithm may be selected according to a requirement in an actual application.

In some implementations, the wearable device 200 can further include a power management module 75 connected with the serial interface 73. The wearable device 200 is configured to receive, through the serial interface 73, electric energy supplied by the power supply apparatus connected with the serial interface 73, so as to supply power to the wearable device 200.

Figure 39:
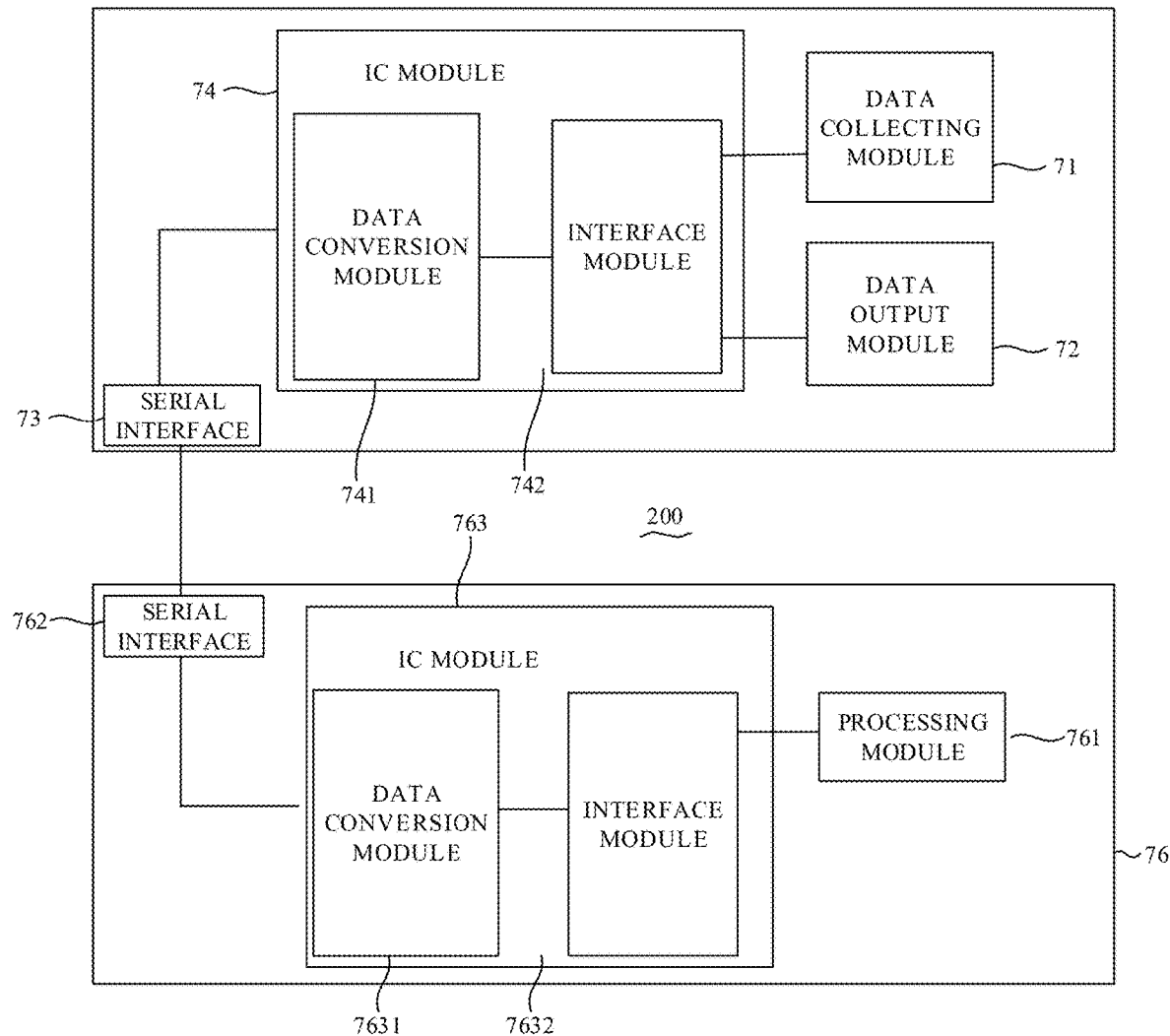
FIG. 39 is a schematic structural view of the wearable device in the implementation of FIG. 37 according to another implementation.

Reference is made to FIG. 39, which is a schematic structural view of the wearable device 200 in the implementation of FIG. 37 according another implementation of the present disclosure. The wearable device 200 can further include a host unit 76. The host unit 76 can include a processing module 761, a serial interface 762, and an IC module 763.

The processing module 761 is connected with the IC module 763. The processing module 761 may be, for example, an application processor (AP), and is configured to process received data, and return the processed data (video data and/or audio data) to the IC module 74 through the IC module 763 for output.

For the serial interface 73, the serial interface 762 may also be a USB interface meeting the USB 2.0 specification, the USB 3.0 specification, and the USB 3.1 specification, and may include a micro USB interface or a USB TYPE-C interface. In addition, the serial interface 762 can be any other types of serial interfaces that can be used for serial data transmission. A cable may be connected between the serial interface 762 and the serial interface 73.

The IC module 763 may include a data conversion module 7631 and an interface module 7632. The data conversion module 7631 is coupled with the processing module 761 via the interface module 7632. The data conversion module 7631 is configured to convert serial data received through the serial interface 762, so as to convert the received serial data into interface data matching an interface protocol of the interface module 7632, and transmit the converted interface data to the processing module 761 through the interface module 7632.

The data conversion module 7631 is further configured to perform serialization processing on processed data (audio data and/or video data) received from the processing module 761 through the interface module 7632, and output converted serial data to the serial interface 73 through the serial interface 762.

It can be understood by those of ordinary skill in the art that, the host unit 76 may be, for example, a dedicated device that is matched with the wearable device 200, or the host unit 76 may also be an electronic device (for example, a smartphone, a tablet computer, or the like) that is configured with the IC module 763. A processor (for example, a CPU or an AP) in the electronic device may be the foregoing processing module 761. By installing a corresponding application program in the electronic device, the processor in the electronic device can perform corresponding processing on data received through the IC module 763.

Figure 40:
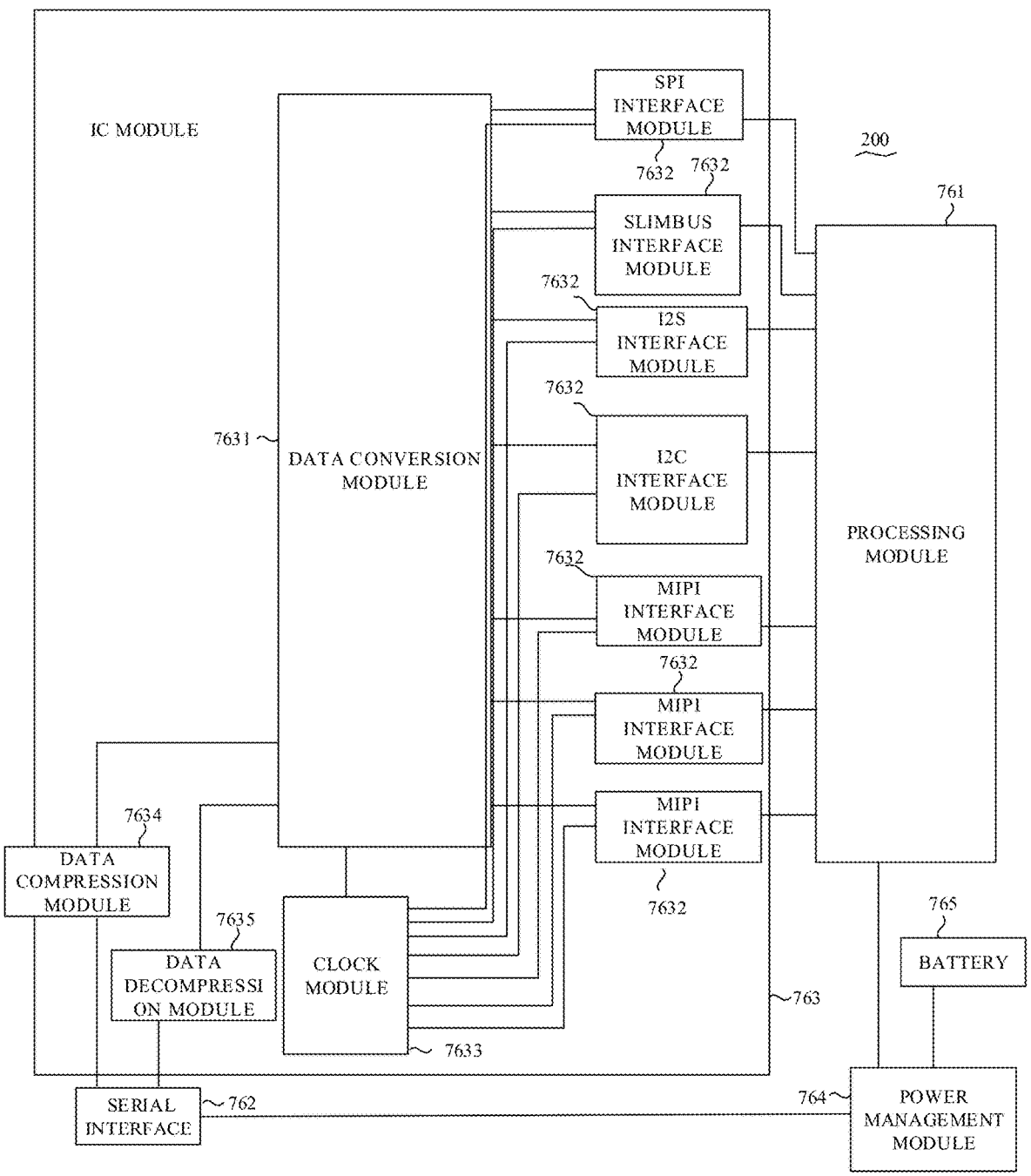
FIG. 40 is a schematic structural view of a host unit in an implementation of FIG. 39.

Reference is made to FIG. 40, which is a schematic structural view of the host unit 76 in FIG. 39 according to an implementations of the present disclosure. The IC module 763 in the host unit 76 may include multiple interface modules 7632, and accordingly the multiple interface modules 7632 may also be an I2C interface module, an SPI interface module, an I2S interface module, a SLIMbus interface module, and a MIPI interface module.

The data conversion module 7631 may transmit audio data converted to the processing module 761 via the SLIMbus interface module 7632 and the SPI interface module 7632. The data conversion module 7631 may transmit video data converted to the processing module 761 via the MIPI interface module 7632 and the I2C interface module 7632. The data conversion module 7631 may transmit eye-movement tracking data converted to the processing module 761 through the MIPI interface module 7632 and the I2C interface module 7632. The data conversion module 7631 may transmit sensor data converted to the processing module 761 via the I2C interface module 7632.

The IC module 763 may also include a clock module 7633 that can transmit clock signals to the data conversion module 7631 and to various interface modules 7632.

In some implementations, the IC module 763 may also include a data compression module 7634 and a data decompression module 7635.

The data compression module 7634 is connected between the data conversion module 7631 and the serial interface 762, and the data decompression module 7635 is connected between the data conversion module 7631 and the serial interface 762.

The data decompression module 7635 is configured to decompress serial data received through the serial interface 762, before the data conversion module 7631 receives the serial data from the serial interface 73 through the serial interface 762, and to transmit decompressed serial data to the data conversion module 7631 for conversion.

The data compression module 7634 is configured to compress serial data to be output, before the data conversion module 7631 outputs converted serial data through the serial interface 762, and to output compressed serial data to the serial interface 73 through the serial interface 762.

It can be understood by those of ordinary skill in the art that a compression algorithm used by the data compression module 744 should match a decompression algorithm used by the data decompression module 7635 in the host unit 76 in FIG. 32, and a compression algorithm used by the data compression module 7634 in the host unit 76 should match a decompression algorithm used by the data decompression module 745 in FIG. 32.

By compressing data to be transmitted, the transmission bandwidth can be saved, and the transmission rate can be improved, thereby further ensuring the real-time performance of the data and improving the user experience. However, it should be noted that, the adopted data compression/decompression algorithm is not limited in the present disclosure, and a specific algorithm may be selected according to a requirement in an actual application.

In some implementations, the host unit 76 can further include a power management module 764 and a battery 765. The power management module 764 is connected with the battery 765 and the serial interface 762 respectively, and is configured to supply power supplied by the battery 765 to the serial interface 762 through the serial interface 762, so as to supply power to the IC module 74, the data collection module 71, and the data output module 72.

As noted above, the host unit 76 may also be implemented as an electronic device.

An electronic device 900 according to implementations of the present disclosure will be described below with reference to FIG. 41. The electronic device 900 illustrated in FIG. 41 is just one example, and will not limit functions and the scope of usage of implementations of the present disclosure.

Figure 41:
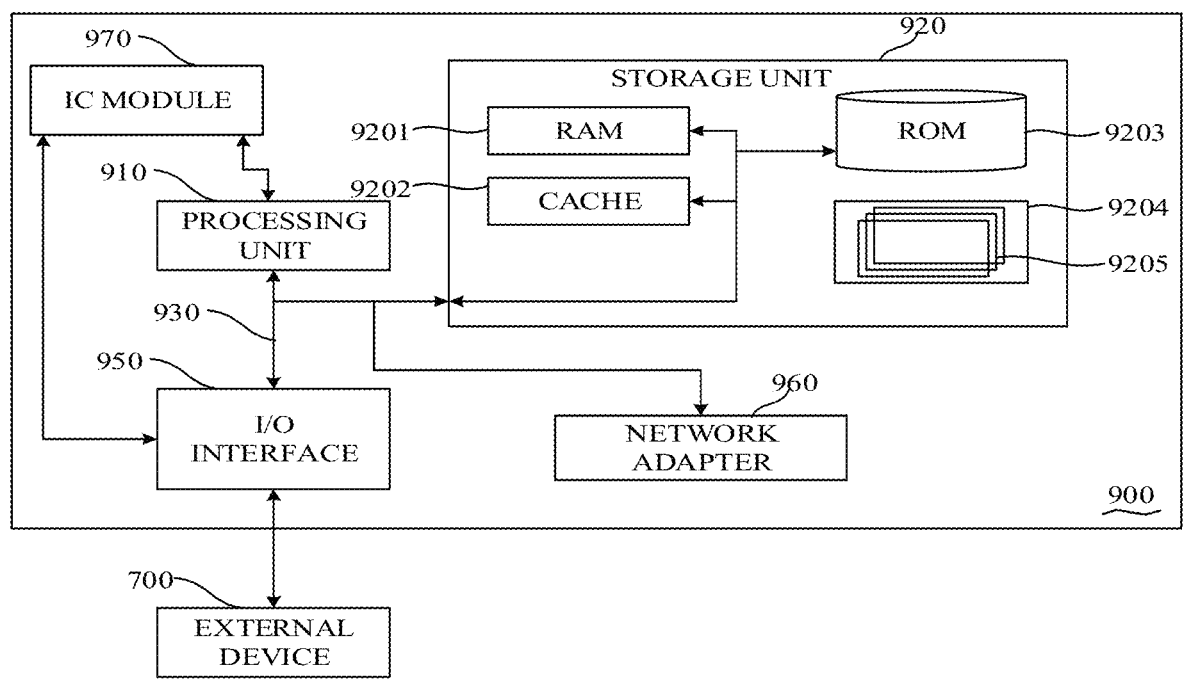
FIG. 41 is a schematic structural view of an electronic device in other implementations of the present disclosure.

As illustrated in FIG. 41, the electronic device 900 is represented in the form of a general-purpose computing device. Components of the electronic device 900 may include, but are not limited to, at least one processing unit 910, at least one storage unit 920, and a bus 930 that connects different system components including the at least one storage unit 920 and the at least one processing unit 910.

The storage unit 920 may include a readable medium in the form of a volatile storage unit, such as a random access storage unit (RAM) 9201 and/or a cache storage unit 9202, and can further include a read-only storage unit (ROM) 9203.

The storage unit 920 may also include a program/utility 9204 having a set of program modules 9205 or at least one program modules 9205, said set of program modules 9205 or at least one program modules 9205 may include, but are not limited to, an operating system, one or more application programs, other program modules and program data, each of these examples or any combination of these examples may include an implementation of a network environment.

The bus 930 may represent one or more of several types of bus structures, including a storage unit bus or a storage unit controller, a peripheral bus, an accelerated graphics port, a processing unit, or a local bus using any of a variety of bus structures.

The electronic device 900 can also communicate with one or more external devices 700 (e.g., a keyboard, a pointing device, a Bluetooth device, etc.), one or more devices that enable a user to interact with the electronic device 900, and/or any devices (e.g., a router, a modem, etc.) that enables the electronic device 900 to communicate with one or more other computing devices. Such communication may be executed through an input/output (I/O) interface 950. In addition, the electronic device 900 may also communicate with one or more networks (e.g., a local region network (LAN), a wide region network (WAN), and/or a public network, such as the Internet) through a network adapter 960. As illustrated, the network adapter 960 communicates with other modules of the electronic device 900 via the bus 930. It should be appreciated that although not illustrated, other hardware and/or software modules could be used in conjunction with the electronic device 900, which includes, but is not limited to: a microcode, a device driver, a redundant processing unit, an external disk drive array, a RAID system, a tape drive, and a data archival storage system, etc.

The processing unit 910 may be a processing module in the host unit as described above, and is connected with the IC module 970 of the electronic device 900. For a specific structure of the IC module 970, reference may be made to FIG. 39 or FIG. 40, and details are not repeatedly described herein. In addition, the input/output interface 950 may be configured to implement the foregoing serial interface.

It should be noted that although several modules or units of the device for action performance are mentioned above in detail, such division is not mandatory. Indeed, according to implementations of the present disclosure, features and functions of two or more of modules or units described above may be implemented in one module or unit. Conversely, features and functions of one module or unit described above may be further divided to be implemented by multiple modules or units.

It should be noted that, all directional indications (such as up, down, left, right, front, back, horizontal, vertical, etc.) in implementations of the present disclosure are only used to explain a relative position relationship, motion state, or the like of each component in a certain specific posture (as illustrated in figures). If the specific posture changes, a directional indication changes accordingly.

It should be noted that the terms "include", "comprise", and "have" as well as variations thereof in implementations of the present disclosure are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The foregoing descriptions are merely some implementations of the present disclosure, but are not intended to limit the scope of protection of the present disclosure. Any equivalent apparatus or equivalent process alternation made by using the description and the accompanying drawings of the present disclosure, or direct or indirect application in other related technical fields, shall belong to the scope of protection of the present disclosure.

What is claimed is:

1. A connecting assembly for a wearable device, comprising:
   a first connector configured to connect a housing assembly of the wearable device;
   a second connector configured to connect a wearable assembly of the wearable device;
   a rotating mechanism connected with the first connector and the second connector respectively; and
   a metal piece connected with the second connector and disposed in the wearable assembly of the wearable device, wherein the metal piece comprises a substrate and a first stud disposed on the substrate, the second connector is provided with a second stud, and the second stud is sleeved on the first stud;
   wherein the first connector and the second connector are configured to rotate relative to each other through the rotating mechanism; and the first connector is provided with a limiting portion at an end of the first connector away from the rotating mechanism, and the limiting portion is configured to cooperate with the housing assembly to limit movement of the first connector.

2. The connecting assembly according to claim 1, wherein the first connector comprises a first connecting portion and a first fixing portion, the first connecting portion is connected with the rotating mechanism, and the first fixing portion is configured to connect the housing assembly; and wherein an end of the first fixing portion away from the first connecting portion is bent and extends to form the limiting portion.

3. The connecting assembly according to claim 2, wherein an extending direction of the limiting portion is perpendicular to a plane where the first fixing portion is located.

4. The connecting assembly according to claim 2, wherein the second connector comprises a second connecting portion and a second fixing portion, the second connecting portion is connected with the rotating mechanism, and the second fixing portion is configured to connect the wearable assembly; and the first connecting portion comprises a first connecting sub-portion and a second connecting sub-portion spaced apart from the first connecting sub-portion, and the second connecting portion is disposed between the first connecting sub-portion and the second connecting sub-portion.

5. The connecting assembly according to claim 4, wherein the first connecting sub-portion defines a first through-hole, the second connecting sub-portion defines a second through-hole, and the second connecting sub-portion defines a third through-hole; and wherein the first through-hole, the second through-hole, and the third through-hole are coaxial.

6. The connecting assembly according to claim 5, wherein the rotating mechanism comprises:
   a first rotating member connected with the first connector;
   a second rotating member connected with the second connector; and
   a rotating shaft penetrating through the first rotating member and the second rotating member;
   wherein the first rotating member and the second rotating member can rotate relative to each other around the rotating shaft to make the first connector and the second connector rotate around the rotating shaft.

7. The connecting assembly according to claim 6, wherein the first through-hole defines at least one first recess at an inner sidewall of the first through-hole, the first rotating member is provided with at least one first projection at an outer sidewall of the first rotating member, and the at least one first recess and the at least one first projection are fitted to connect the first rotating member with the first connector; and the third through-hole defines at least one second recess at an inner sidewall of the third through-hole, the second rotating member is provided with at least one second projection at an outer sidewall of the second rotating member, and the at least one second recess and the at least one second projection are fitted to connect the second rotating member with the second connector.

8. The connecting assembly according to claim 7, wherein the first rotating member is provided with at least one sliding block on one side of the first rotating member close to the second rotating member; the second rotating member defines at least one sliding groove on one side of the second rotating member close to the first rotating member; and the first rotating member is connected with the second rotating member through the at least one sliding block and the at least one sliding groove.

9. The connecting assembly according to claim 7, wherein the rotating mechanism further comprises an elastic piece and a fastener, the elastic piece is disposed between the second rotating member and the second connecting sub-portion, and the fastener is disposed on one side of the second connecting sub-portion away from the elastic piece; and the rotating shaft further penetrates through the elastic piece and the second connecting sub-portion, and the fastener is configured to fix the rotating shaft.

10. The connecting assembly according to claim 1, further comprising another metal piece, wherein the another metal piece is connected with the first connector and disposed in the housing assembly of the wearable device, and the another metal piece is of a nut structure.

11. A wearable device, comprising:
    a wearable assembly;
    a housing assembly;
    an optical-mechanical assembly accommodated in the housing assembly;
    a camera assembly accommodated in the housing assembly; and
    a connecting assembly comprising:

a first connector configured to connect the housing assembly;

a second connector configured to connect the wearable assembly; and a rotating mechanism connected with the first connector and the second connector respectively;

wherein the first connector and the second connector are configured to rotate relative to each other through the rotating mechanism; and the first connector is provided with a limiting portion at an end of the first connector away from the rotating mechanism, and the limiting portion is configured to cooperate with the housing assembly to limit movement of the first connector;

wherein the housing assembly defines an accommodating groove at an end of the housing assembly close to the connecting assembly, and the connecting assembly is partially disposed in the accommodating groove; and the wearable assembly defines an accommodating cavity at an end of the wearable assembly close to the connecting assembly, and the connecting assembly is partially disposed in the accommodating cavity.

12. The wearable device according to claim 11, wherein the wearable assembly is provided with a first shield and a second shield at an end of the wearable assembly close to the housing assembly, the first shield is covered on one side of the connecting assembly, and the second shield is covered on another side of the connecting assembly opposite to said one side; and the first shield and the second shield each extends from the end of the wearable assembly into the accommodating cavity.

13. The wearable device according to claim 11, wherein the first connector defines at least one first fixing hole, the second connector defines at least one second fixing hole, the housing assembly defines at least one third fixing hole fitted with the at least one first fixing hole, and the wearable assembly defines at least one fourth fixing hole fitted with the at least one second fixing hole; and wherein an axis of each of the at least one first fixing hole is perpendicular to a rotation axis of the rotating mechanism, and an axis of each of the at least one second fixing hole is perpendicular to the rotation axis of the rotating mechanism.

14. The wearable device according to claim 13, wherein the accommodating groove defines a fifth fixing hole at a sidewall of the accommodating groove, a rotating shaft of the rotating mechanism defines a rotating-shaft fixing hole, and the rotating-shaft fixing hole and the fifth fixing hole corporate to fix the rotating shaft; an axis of the fifth fixing hole and an axis of the rotating-shaft fixing hole is each parallel to an axis of the rotating shaft.

15. The wearable device according to claim 14, wherein the connecting assembly comprises at least one metal piece, and the at least one metal piece is connected with the first connector and is disposed in the housing assembly; and the at least one first metal piece is disposed in the at least one third fixing hole by hot melting in one-to-one correspondence.

16. The wearable device according to claim 14, wherein the connecting assembly further comprises a metal piece, and the metal piece is connected with the second connector and is disposed in the wearable assembly; and the metal piece and a first housing of the wearable assembly are integrally formed by an injection molding process.

17. A wearable apparatus, comprising:

a housing assembly;

an optical-mechanical assembly accommodated in the housing assembly;

a camera assembly accommodated in the housing assembly;

a wearable assembly comprising a first wearable member and a second wearable member, wherein the first wearable member and the second wearable member are respectively connected with the housing assembly, and the first wearable member and the second wearable member are each in an arc-strip-shape and extending in a direction of approaching to each other, to make the wearable assembly clamp when being worn; and a connecting assembly comprising:

a first connector configured to connect the housing assembly;

a second connector configured to connect the wearable assembly; and a rotating mechanism connected with the first connector and the second connector respectively;

wherein the first connector and the second connector are configured to rotate relative to each other through the rotating mechanism; and the first connector is provided with a limiting portion at an end of the first connector away from the rotating mechanism, and the limiting portion is configured to cooperate with the housing assembly to limit movement of the first connector.

* * * * *